US012542250B2

(12) United States Patent
Shivell

(10) Patent No.: US 12,542,250 B2
(45) Date of Patent: Feb. 3, 2026

(54) CONTROL DEVICE BASE THAT ATTACHES TO THE PADDLE ACTUATOR OF A MECHANICAL SWITCH

(71) Applicant: Lutron Technology Company LLC, Coopersburg, PA (US)

(72) Inventor: William Taylor Shivell, Breinigsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/545,159

(22) Filed: Dec. 19, 2023

(65) Prior Publication Data

US 2024/0120163 A1 Apr. 11, 2024

Related U.S. Application Data

(63) Continuation of application No. 18/112,183, filed on Feb. 21, 2023, now Pat. No. 11,901,139, which is a (Continued)

(51) Int. Cl.

| | |
|---|---|
| ***H01H 23/04*** | (2006.01) |
| ***H01H 3/12*** | (2006.01) |
| ***H01H 23/14*** | (2006.01) |
| ***H05B 47/175*** | (2020.01) |
| *H01H 3/02* | (2006.01) |
| *H05B 47/19* | (2020.01) |

(52) U.S. Cl.

CPC .............. *H01H 23/04* (2013.01); *H01H 3/12* (2013.01); *H01H 23/145* (2013.01); *H05B 47/1965* (2024.01); *H01H 2003/0293* (2013.01); *H05B 47/19* (2020.01)

(58) Field of Classification Search

CPC ...... H01H 23/145; H01H 23/16; H01H 19/14; H01H 23/14; H01H 23/24; H01H 23/02; H01H 2221/016; H01H 23/143; H01H 23/003; H01H 23/30; H01H 23/00

See application file for complete search history.

(56) References Cited

U.S. PATENT DOCUMENTS

| | | | |
|---|---|---|---|
| 5,319,996 | A | 6/1994 | Harris |
| 11,610,748 | B2 | 3/2023 | Shivell |

(Continued)

FOREIGN PATENT DOCUMENTS

| | | |
|---|---|---|
| CN | 203071420 U | 7/2013 |
| CN | 104851718 A | 8/2015 |

*Primary Examiner* — Ahmed M Saeed

(74) *Attorney, Agent, or Firm* — Flaster Greenberg P.C.

(57) ABSTRACT

A remote control device may control electrical loads and/or load control devices of a load control system without accessing electrical wiring. The remote control device may be configured to be mounted over an installed mechanical switch having a paddle actuator and may include a base and a control unit that is configured to be removably attached to the base. The base may include a frame, a clamp arm, a screw, and/or a sleeve. The clamp arm may be configured to secure the base to a protruding portion of the paddle actuator. The clamp arm may be attached to the frame at a pivot joint. The clamp arm may be configured to pivot about the pivot joint. The pivot joint may be located proximate to an endpoint or a midpoint of the frame.

27 Claims, 23 Drawing Sheets

Related U.S. Application Data continuation of application No. 17/363,052, filed on Jun. 30, 2021, now Pat. No. 11,610,748, which is a continuation of application No. 16/676,934, filed on Nov. 7, 2019, now Pat. No. 11,069,493.

(60) Provisional application No. 62/878,527, filed on Jul. 25, 2019, provisional application No. 62/756,637, filed on Nov. 7, 2018.

(56) References Cited

U.S. PATENT DOCUMENTS

| | | | | |
|---|---|---|---|---|
| 11,901,139 | B2 * | 2/2024 | Shivell .................. | H05B 47/19 |
| 2008/0218099 | A1 | 9/2008 | Newman | |
| 2013/0106287 | A1 | 5/2013 | Savicki, Jr. et al. | |
| 2017/0352506 | A1 | 12/2017 | Dimberg | |
| 2017/0354023 | A1 | 12/2017 | Dimberg et al. | |
| 2019/0036529 | A1 | 1/2019 | Bushnell et al. | |

* cited by examiner

CONTROL DEVICE BASE THAT ATTACHES TO THE PADDLE ACTUATOR OF A MECHANICAL SWITCH

CROSS-REFERENCE TO RELATED CASES

This application is a continuation of U.S. patent application Ser. No. 18/112,183, filed Feb. 21, 2023, which is continuation of U.S. patent application Ser. No. 17/363,052, filed Jun. 30, 2021, which is continuation of U.S. patent application Ser. No. 16/676,934, filed Nov. 7, 2019, which claims the benefit of U.S. Provisional Patent Application No. 62/756,637, filed Nov. 7, 2018, and U.S. Provisional Patent Application No. 62/878,527, filed Jul. 25, 2019, the contents of which are incorporated herein by reference in their entirety.

BACKGROUND

During the installation of typical load control systems, standard mechanical switches, such as traditional toggle switches or decorator paddle switches, may be replaced by more advanced load control devices, such as dimmer switches, that control the amount of power delivered from an alternating current (AC) power source to one or more electrical loads. Such an installation procedure typically requires that the existing mechanical switch be disconnected from the electrical wiring and removed from a wallbox in which it is mounted, and that the load control device then be connected to the electrical wiring and installed in the wall-box. An average consumer may not feel comfortable performing the electrical wiring required in such an installation. Accordingly, such a procedure may typically be performed by an electrical contractor or other skilled installer. However, hiring an electrical contractor may be cost prohibitive to the average consumer.

Controllable light sources, such as controllable screw-in light-emitting diode (LED) lamps, may provide an easier solution for providing advanced control of lighting. For example, an older incandescent lamp simply be unscrewed from a socket and the controllable light source may be screwed into the socket. The controllable light sources may be controlled by remote control devices. However, the sockets in which the controllable light sources are installed may be controlled by an existing wall-mounted light switch. When the wall-mounted light switch is operated to an off position, power to the controllable light source may be cut, such that the controllable light source may no longer respond to commands transmitted by the remote control devices. Accordingly, it is desirable to prevent operation of such a wall-mounted light switch to ensure that the delivery of power to the controllable light source continues uninterrupted.

SUMMARY

As described herein, a remote control device for use in a load control system, for example to control electrical loads and/or load control devices, may be configured to be mounted over an installed mechanical switch having a paddle actuator. The mechanical switch may control whether power is delivered to an electrical load. The remote control device may be installed without accessing electrical wiring of the mechanical switch.

The remote control may include a base and a control unit that is configured to be removably attached to the base. The control unit may include a user interface and a wireless communication circuit. The control unit may translate a user input received at the user interface into a control signal that controls a load control device. The control unit may cause the wireless communication circuit to transmit the control signal.

The base may include a frame, a clamp arm, a screw, and/or a sleeve. The frame may define an opening that is configured to receive a protruding portion of the paddle actuator. When the protruding portion of the paddle actuator is received in the opening, the frame may at least partially surround the paddle actuator. The frame may include an outer wall that extends along a perimeter of the frame. The frame may define one or more teeth that extend into the opening. The one or more teeth may be configured to engage the protruding portion of the paddle actuator, for example, to secure the base thereto. The frame may be configured for releasable attachment of the control unit. The outer wall may define one or more snaps configured to engage corresponding features in the control unit.

The clamp arm may define one or more teeth configured to engage the protruding portion of the paddle actuator, for example, to secure the base thereto. The clamp arm may be configured to secure the base to the protruding portion of the paddle actuator. The sleeve may be defined by the frame or may be attached to the frame. The sleeve may include a threaded hole therethrough. The screw may be received in the sleeve and may be operatively engaged with the clamp arm. When the screw is rotated, the clamp arm may be moved toward the protruding portion of the paddle actuator until the clamp arm abuts the protruding portion of the paddle actuator. The clamp arm may be configured to apply a force on the protruding portion of the paddle actuator as the screw is further rotated when the clamp arm abuts the protruding portion of the paddle actuator. The force applied by the clamp arm may be configured to secure the base to the protruding portion of the paddle actuator The clamp arm may be attached to the frame at a pivot joint. The clamp arm may be configured to pivot about the pivot joint. The pivot joint may be located proximate to a midpoint of the frame. The clamp arm may define a threaded hole that is configured to receive the screw. The screw (e.g., the head of the screw) may be configured to pull the clamp arm toward the protruding portion of the paddle actuator as the screw is rotatably received by the threaded hole.

Alternatively, the pivot joint may be located proximate to a lower edge of the frame. The clamp arm may define a plate that is configured to engage a distal end of the screw. The screw may be configured to push the plate while rotating such that the clamp arm moves toward the protruding portion of the paddle actuator as the distal end of the screw engages the plate.

A remote control device may include a battery holder that is configured to be received within a void defined by the remote control device. The battery holder may be configured to receive a battery for powering electrical circuitry of the remote control device. The battery holder may include a mounting flange, a first arm, and a second arm. The mounting flange may be configured to attach the battery holder to a printed circuit board (PCB) of the remote control device. The first arm may extend from the mounting flange in a first direction. The first arm may be configured to secure the battery of the remote control device within the battery holder in a first position. The second arm may extend from the mounting flange in a second direction that is opposed to the first direction. The second arm may be configured to secure the battery of the remote control device within the battery holder in a second position. The first arm may be configured to electrically couple the battery, in the first position, to the remote control device via the PCB. The second arm may be configured to electrically couple the battery, in the second position, to the remote control device via the PCB.

A battery holder of a remote control device may include mounting flanges, an electrical contact member, a slot, and a tab. The mounting flanges may be configured to attach the battery holder to a PCB of the remote control device. The electrical contact member may extend between the mounting flanges. The electrical contact member may be configured to electrically couple the battery to the remote control device via the PCB. The electrical contact member may define a first edge and an opposed second edge. The electrical contact member may be configured to secure the battery of the remote control device within the battery holder in a first position when installed from the first edge. The electrical contact member may be configured to secure the battery of the remote control device within the battery holder in a second position when installed from the second edge. The slot may be defined between the electrical contact member and the PCB. The slot may be configured to receive the battery. The tab may be configured to engage the battery when installed in the first position and the second position. The tab may be configured to prevent the battery from being installed within the battery holder beyond a predefined location.

A remote control device may include a control unit, a cover base, a cover portion, and a control base. The control unit may include a user interface and/or a wireless communication circuit. The control unit may be configured to translate a user input from the user interface into a control signal that controls a load control device. The control unit may be configured to cause the wireless communication circuit to transmit the control signal. The cover base may define an opening that is configured to receive a protruding portion of a paddle actuator of the mechanical switch. The protruding portion of the paddle actuator may project outward when the mechanical switch is operated into a position that causes power to be delivered to the electrical load. When the protruding portion is received in the opening, the frame may at least partially surround the paddle actuator. The cover base may include a clamp arm that is configured to secure the cover base to the protruding portion of the paddle actuator. The cover base may include a screw that is operatively engaged with the clamp arm such that, when the screw is rotated, the clamp arm is moved toward the protruding portion of the paddle actuator until the clamp arm abuts the protruding portion of the paddle actuator. The cover portion may be configured to cover the paddle actuator and the cover base. The control unit may be configured to releasably attach to the control base. The clamp arm may be configured to apply a force upon the protruding portion of the paddle actuator as the screw is further rotated when the clamp arm abuts the protruding portion of the paddle actuator. The force applied by the clamp arm may be configured to secure the cover base to the protruding portion of the paddle actuator.

DETAILED DESCRIPTION

Figure 1:
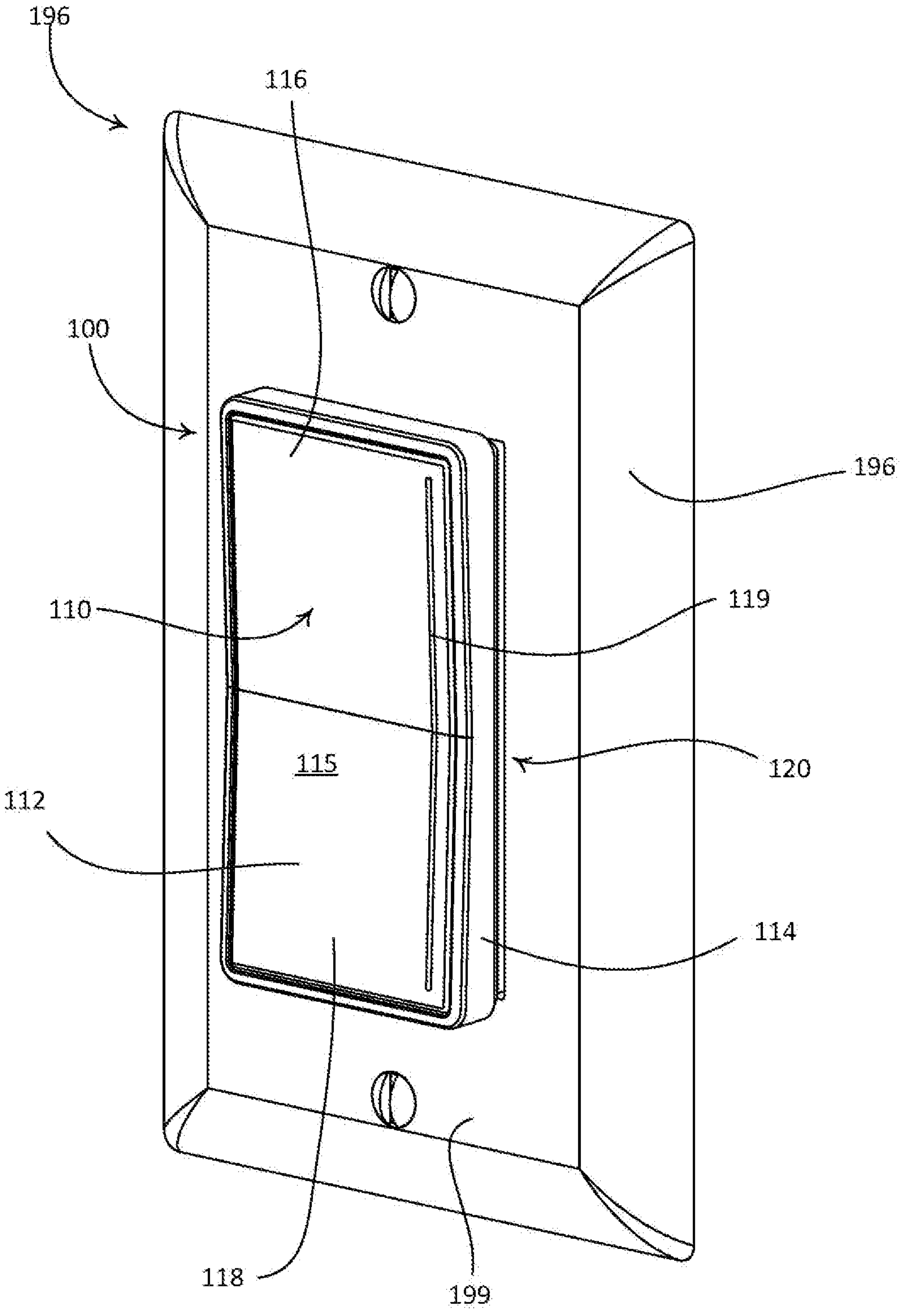
FIG. 1 is a perspective view of an example remote control device, with the remote control device mounted in an installed position over a light switch.

FIG. 1 depicts an example remote control device 100 that may be installed in a load control system, such as a lighting control system. FIGS. 2-8 depict an example base 120 (e.g., a base component) of the example remote control device 100 installed in the load control system. The load control system may include a mechanical switch, such as the illustrated mechanical switch 190, that may be in place prior to installation of the remote control device 100, for example pre-existing in the load control system. As shown, the mechanical switch 190 may be a standard decorator paddle switch. The load control system may further include one or more electrical loads, such as lighting loads. The mechanical switch 190 may be coupled in series electrical connection between an alternating current (AC) power source and the one or more electrical loads (not shown).

The mechanical switch 190 may include a paddle actuator 192 that may be actuated to turn on and/or turn off, the one or more electrical loads. The mechanical switch 190 may include a bezel 194 that surrounds the paddle actuator 192. The mechanical switch 190 may include a yoke (not shown) that enables mounting of the mechanical switch 190 to a structure. For example, the yoke of the illustrated mechanical switch 190 may be fastened to a single-gang wallbox that is installed in an opening of a wall. As shown, a faceplate 196 may be secured to the mechanical switch 190, for instance to the yoke. The faceplate 196 may define an opening 198 that extends therethrough. The opening 198 may be sized to receive the bezel 194 therein, such that a narrow gap 197 is defined between the bezel 194 and the opening 198 around the perimeter of the bezel 194. As shown, with the faceplate 196 secured to the mechanical switch 190, the bezel 194 may protrude beyond an outer surface 199 of the faceplate 196. The outer surface 199 of the faceplate 196 may alternatively be referred to as a front surface of the faceplate 196.

In accordance with the illustrated orientation of the mechanical switch 190, an upper portion of the paddle actuator 192 may define a first actuation surface 191 that may be pressed to operate the paddle actuator 192 into a first position (e.g., as shown in FIG. 2A) from a second position, and a lower portion of the paddle actuator 192 may define a second actuation surface 193 that may be pressed to operate the paddle actuator 192 from the first position into the second position. As shown, the first position of the paddle actuator 192 may correspond to an "on" position of the mechanical switch 190, which corresponds to the mechanical switch 190 allowing power from the AC power source to be delivered to the one or more electrical loads. With the paddle actuator 192 in the first position, the lower portion of the paddle actuator 192 may project outward relative to the bezel 194 and the faceplate 196. The lower portion of the paddle actuator 192 that projects outward relative to the bezel 194 and the faceplate 196 may be referred to as a protruding portion of the paddle actuator 192. It should be appreciated that in an alternative configuration in which the second position of the paddle actuator 192 corresponds to the first position of the mechanical switch 190, the upper portion of the paddle actuator 192 may project outward relative to the bezel 194 and the faceplate 196, and thus may be referred to as the protruding portion of the paddle actuator 192.

The load control system may further include a load control device (not shown) that is electrically connected to the one or more electrical loads (e.g., lighting loads). The load control device may include a load control circuit for controlling the intensity of one or more of the lighting loads between a low-end intensity (e.g., approximately 1%) and a high-end intensity (e.g., approximately 100%), and may include a wireless communication circuit. In an example implementation, the load control device may be a standalone dimmer switch that is electrically connected to the one or more lighting loads. In another example implementation, each of the one more electrical loads may be a controllable light source (e.g., a screw-in light-emitting diode (LED) lamp) that each may include a respective integrated load control circuit and wireless communication circuit (e.g., the electrical load includes a corresponding load control device that is configured for wireless communication). It should be appreciated that the load control system is not limited to the example load control devices described herein.

As shown, the example remote control device 100 may include a control unit 110 that may be mounted to the base 120. The base 120 may alternatively be referred to as a base portion or a mounting assembly. The control unit 110 and the base 120 may be configured such that the control unit 110 may be removably attached to the base 120. The base 120 may be attached to the paddle actuator 192 of the mechanical switch 190 without removing the faceplate 196. In this regard, the remote control device 100 may be mounted over an installed mechanical switch, such as the mechanical switch 190, without the need to remove the faceplate 196 and/or perform any electrical re-wiring of the mechanical switch 190.

The control unit 110 may include a user interface comprising an actuation portion 112 that may be attached to a housing 114. The actuation portion 112 may include a front surface 115 having an upper portion 116 and a lower portion 118. The actuation portion 112 may be configured to pivot about a central axis in response to an actuation of the upper portion 116 and the lower portion 118. The control unit 110 may be configured to control an electrical load. For example, the control unit 110 may be configured to turn the electrical load on in response to an actuation of the upper portion 116 and to turn the electrical load off in response to an actuation of the lower portion 118. The front surface 115 of the actuation portion 112 may also be configured as a touch sensitive surface (e.g., a capacitive touch surface) that is configured to receive (e.g., detect) inputs, such as gestures, from a user of the control unit 110. The control unit 110 may also include a light bar 119 configured to be illuminated by one or more light sources (e.g., one or more LEDs) to visibly display information. The front surface 115 of the actuation portion 112 may be actuated along the light bar 119 to adjust the amount of power delivered to the electrical load according to the position of the actuation.

As shown, the base 120 may include a clamp arm 130 (e.g., a bar), a screw 140, and a frame 150. The frame 150 may include a plate 152 and an outer wall 154 that extends from the plate 152. The outer wall 154 may extend from a perimeter of the plate 152. The outer wall 154 may include a first end wall 122, an opposed second end wall 124, and opposed side walls 126 that extend from respective ends of the first end wall 122 to corresponding ends of the second end wall 124. The plate 152 may define a rear surface 128 of the base 120.

The frame 150 may define an opening 156. The opening 156 may be configured to receive the protruding portion of the paddle actuator 192, for example, when the base 120 is installed over the mechanical switch 190. When the protruding portion of the paddle actuator 192 is received in the opening 156, the frame 150 may at least partially surround the paddle actuator 192. The opening 156 may extend through approximately a lower half of the plate 152. The base 120 may define one or more teeth 144. The teeth 144 may extend into the opening 156. For example, the teeth 144 may extend into the opening 156 proximate to the rear surface 128 of the base 120. The teeth 144 may be configured to engage a side of the protruding portion of the paddle actuator 192.

The frame 150 may define a sleeve 142 that is configured to receive the screw 140. The sleeve 142 may include internal threads that cooperate with the threads of the screw 140. The sleeve 142 may be located along the second end wall 124 of the outer wall 154. Although the sleeve 142 is biased toward the clamp arm 130 in FIGS. 1-8, it should be appreciated that the sleeve 142 may be located at a midpoint of the second end wall 124, biased towards the side wall 126 that is distal from the clamp arm 130, or another location along the second end wall 124. A length of the screw 140 may be configured based on the location of the sleeve 142 along the second end wall 124. Although the sleeve 142 is located along the second end wall 124 of the frame 150, it should be appreciated that the sleeve 142 may be located at other locations of the base 120.

The outer wall 154 may define a plurality of attachment members 157. For example, each of the opposed side walls may include on or more attachment members 157. The attachment members 157 may be configured to engage corresponding features of the housing 114 of the control unit 110 such that the control unit can be releasably attached to the base 120. The attachment members 157 may be snaps (e.g., resilient snap-fit connectors).

Figure 8:
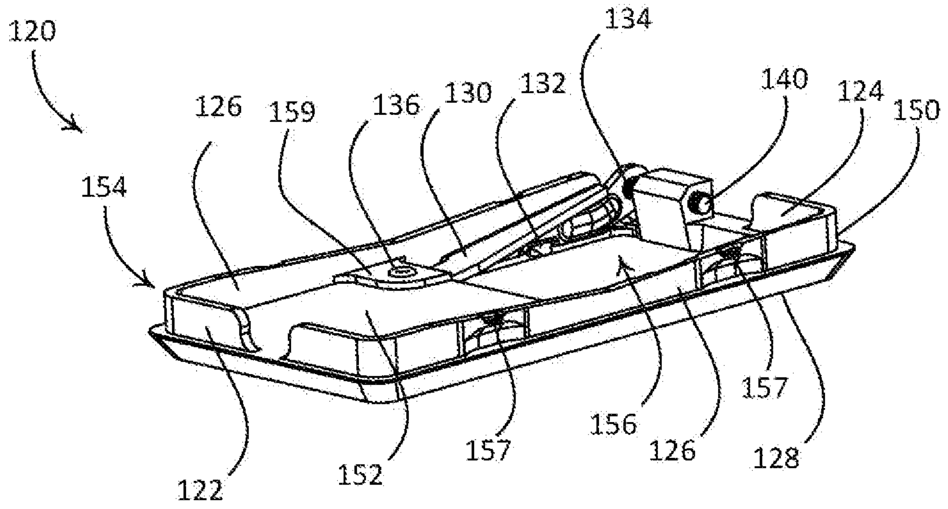
FIG. 8 is another perspective view of the example base component of the example remote control device illustrated in FIG. 1.

The clamp arm 130 may be configured to secure (e.g., attach) the base 120 to the protruding portion of the paddle actuator 192 of the mechanical switch 190. The clamp arm 130 may abut the protruding portion of the paddle actuator 192. For example, as shown the clamp arm 130 may be configured to apply a force on the protruding portion of the paddle actuator 192 as the screw 140 is driven (e.g., further rotated) into the sleeve 142. The clamp arm 130 may define a hole 134 (e.g., as shown in FIG. 8) that is configured to receive the screw 140. A head 141 of the screw 140 may be configured to abut the clamp arm 130 as the screw 140 is driven into the sleeve 142. The clamp arm 130 may include one or more teeth, for example, such as the tooth 132 shown in FIG. 8. The tooth 132 may extend from the clamp arm 130 and into the opening 156. The tooth 132 may be configured to engage (e.g., bite into) the protruding portion of the paddle actuator 192. Although shown as having a triangular prism-like shape, it should be appreciated that the tooth 132 may define various shapes, for example, such as a cylinder-like shape, a cone-like shape, a pyramid-like shape, and/or another similar shape.

The clamp arm 130 may be pivotally attached to the base 120. For example, the base 120 may define a tab 159 that extends from the outer wall 154 (e.g., one of the side walls 126) of the base 120. The tab 159 may define a pivot joint 136 therethrough. The pivot joint 136 may be located proximate to a midpoint of the frame 150. The clamp arm 130 may be connected to the tab 159 at the pivot joint 136. The pivot joint 136 may be configured to enable operation of the clamp arm 130 between a disengaged position and an engaged position with the protruding portion of the paddle actuator 192. The screw 140 may be operatively engaged with the clamp arm 130. For example, the clamp arm 130 may pivot about the pivot joint 136 and move toward the protruding portion of the paddle actuator 192 as the screw 140 is rotated within the sleeve 142. The clamp arm 130 may move toward the protruding portion of the paddle actuator 192 until the clamp arm 130 abuts the protruding portion.

The disengaged position may be defined as the clamp arm 130 being located proximate to the outer wall 154. The engaged position may be defined as the clamp arm 130 being located distal from the outer wall 154 and/or over the opening 156. Clockwise rotation of the screw 140 may pivot the clamp arm 130 from the disengaged position to the engaged position. Counter-clockwise rotation of the screw 140 may pivot the clamp arm 130 from the engaged position to the disengaged position. The pivot joint 136 may be a revolute joint (e.g., such as a pin joint or a hinge joint) having a pin that extends through the tab 159 and the clamp arm 130. The pivot joint 136 may be configured to enable the clamp arm 130 to rotate about the pin (e.g., an axis defined by the pin). Alternatively, the pivot joint 136 may be a cylindrical joint, a spherical joint, a saddle joint, or another similar joint.

In accordance with the illustrated configuration of the base 120, the base 120 may be configured such that the rear surface 128 of the base 120 abuts the bezel 194 and may not contact the outer surface 199 of the faceplate 196. It should be appreciated that the outer wall 154 of the base 120 is not limited to the illustrated geometry. For example, the base 120 may be alternatively configured such that the outer wall 154 surrounds the bezel 194 and at least a portion of the rear surface 128 of the base 120 abuts the outer surface 199 of the faceplate 196 when the base 120 is attached to the protruding portion of the paddle actuator 192. In another example, the base 120 may be alternatively configured such that the outer wall 154 encloses the faceplate 196 of the mechanical switch 190, for instance such that the rear surface 128 of the base 120 abuts a surface of a structure in which the mechanical switch 190 is installed, such as a surface of a wall.

The base 120 and the control unit 110 may be configured to enable releasable attachment of the control unit 110 to the base 120. For example, one or more components of the base 120 may include engagement features that may be configured to engage with complementary engagement features of the housing 114 of the control unit 110. As shown, the attachment members 157 may define resilient snap-fit connectors that may be configured to engage with complementary engagement features (not shown) defined on corresponding inner surfaces of the control unit 110. In this regard, the frame 150 may be configured for releasable attachment of the control unit 110 to the frame 150, via the attachment members 157.

The user interface of the control unit 110 (e.g., the actuation portion 112) may be configured to receive inputs, such as finger presses and/or gestures, from a user of the remote control device 100. For example, in accordance with the illustrated configuration, the actuation portion 112 of the control unit 110 may be configured to pivot about a central axis, when the housing 114 is attached to the base 120, in response to actuations of respective upper and lower portions 116, 118 of the actuation portion 112. The front surface 115 of the actuation portion 112 may define a capacitive touch surface along the upper and lower portions 116, 118, that may be configured to detect touches along an x-axis, a y-axis, or both an x-axis and a y-axis.

The control unit 110 may include a control circuit (e.g., a processor, not shown) and a wireless communication circuit (e.g., an RF transceiver, not shown). The control unit 110 may be configured to translate one or more inputs (e.g., user inputs) from the user interface into respective control signals that may be used to control a load control device of a load control system. The one or more inputs may be applied via touches or presses of the upper portion 116 and/or lower portion 118 of the actuation portion 112. For example, the control circuit may be configured to receive input signals (e.g., that correspond to the user inputs) in response to actuations of the upper portion 116 and/or lower portion 118 by a user of the remote control device 100. For example, the input signals received by the control circuit may be the respective control signals translated from the user interface inputs. The control circuit may be configured to generate commands that the user desires the control unit 110 to execute in response to the input signals produced in response to actuations of the upper portion 116 and/or lower portion 118. The control unit 110 may be configured to cause the wireless communication circuit to transmit one or more control signals including the commands generated by the control circuit.

The light bar 119 of the control unit 110 may be configured to provide a visual indication of a command issued by the remote control device 100. For example, the control circuit may be configured to, upon receiving a gesture indicative of a command to change an amount of power delivered to an electrical load, such as a command to dim a lighting load, indicate the amount of power delivered to the electrical load by temporarily illuminating a number of the LEDs that corresponds with the desired amount of power (e.g., the desired dimming level of the lighting load). In such an example, the control circuit may be configured to cause the LEDs to be illuminated simultaneously, to illuminate sequentially with some or little overlap before fading, or to otherwise illuminate as desired. The control unit 110 may be configured to be attached to the base 120 with the light bar 119 located on a predetermined side of the control unit (e.g., the right side of the control unit as shown in FIG. 1), for example, such that the light bar 119 may be illuminated to indicate the amount of power presently being delivered to the electrical load.

The control circuit may be configured to cause the wireless communication circuit to transmit respective commands that correspond to inputs and/or gestures received by the upper portion 116 and/or lower portion 118. For example, the remote control device 100 may be operable to transmit wireless signals, for example radio frequency (RF) signals, to a load control device, one or more electrical loads, and/or a central processor of a load control system. The remote control device 100 may be associated with the load control device and the one or more electrical loads during a configuration procedure of the load control system.

The control unit 110 may be battery-powered. The housing 114 of the control circuit 110 may be configured to receive a battery (not shown) for powering the control unit 110 (e.g., as will be described in greater detail below with reference to FIGS. 16-24). The remote control device 100 may optionally include the battery. For example, the control unit 110 may be configured to derive power from an external power source, for example, a power source connected to the mechanical switch 170, such as source of AC power, or an external DC power source. The base 120 may include the power source, such as a battery that is external to the control unit 110. The base 120 may be configured to provide power from the battery to the control unit 110 when the control unit 110 is attached to the base 120. For example, the base 120 may include a battery printed circuit board (PCB) (not shown) that may be mounted to the plate 152.

In an example process of attaching the base 120 to the paddle actuator 192 of the mechanical switch 190, the base 120 may be placed over the paddle actuator 192 such that the protruding portion of the paddle actuator extends through the opening 156. The clamp arm 130 may be in the disengaged position when the base 120 is placed over the paddle actuator 192. The rear surface 128 of the base 120 may abut the outer surface 199 of the faceplate 196 and/or the bezel 194 of the mechanical switch 190 when the base 120 is placed over the paddle actuator 192. The screw 140 may be operated such that the threads of the screw 140 engage the internal threads of the sleeve 142. When the screw 140 is operated (e.g., clockwise), the clamp arm 130 may pivot about the pivot joint 136 such that the clamp arm 130 moves toward the protruding portion of the paddle actuator 192. As the screw 140 is further operated (e.g., clockwise), the clamp arm 130 may abut the protruding portion of the paddle actuator 192. The clamp arm 130 and/or the teeth 132, 144 may apply a force upon the protruding portion of the paddle actuator 192. For example, the tooth 132 and the teeth 144 may captively engage (e.g., bite into) the protruding portion of the paddle actuator 192 as the screw 140 is further operated. The base 120 may be secured to the protruding portion of the paddle actuator 192 when the tooth 132 and the teeth 144 captively engage (e.g., bite into) the protruding portion of the paddle actuator 192.

Figure 3:
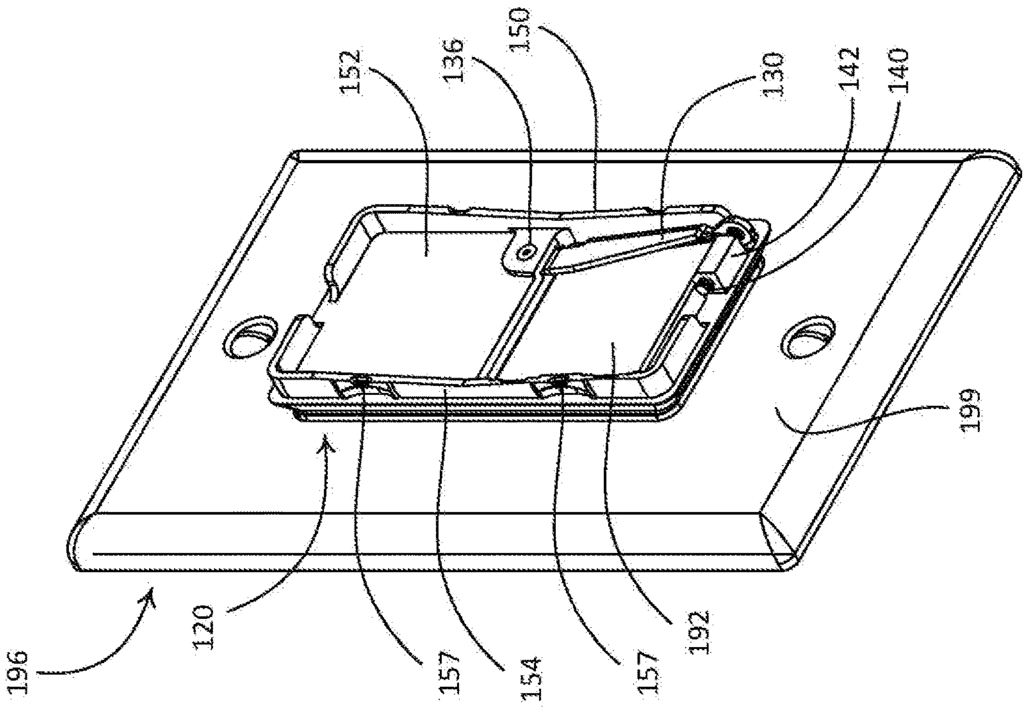
FIG. 3 is another perspective view of the example base component of the example remote control device illustrated in FIG. 1 attached to the paddle actuator of the light switch.
Figure 2:
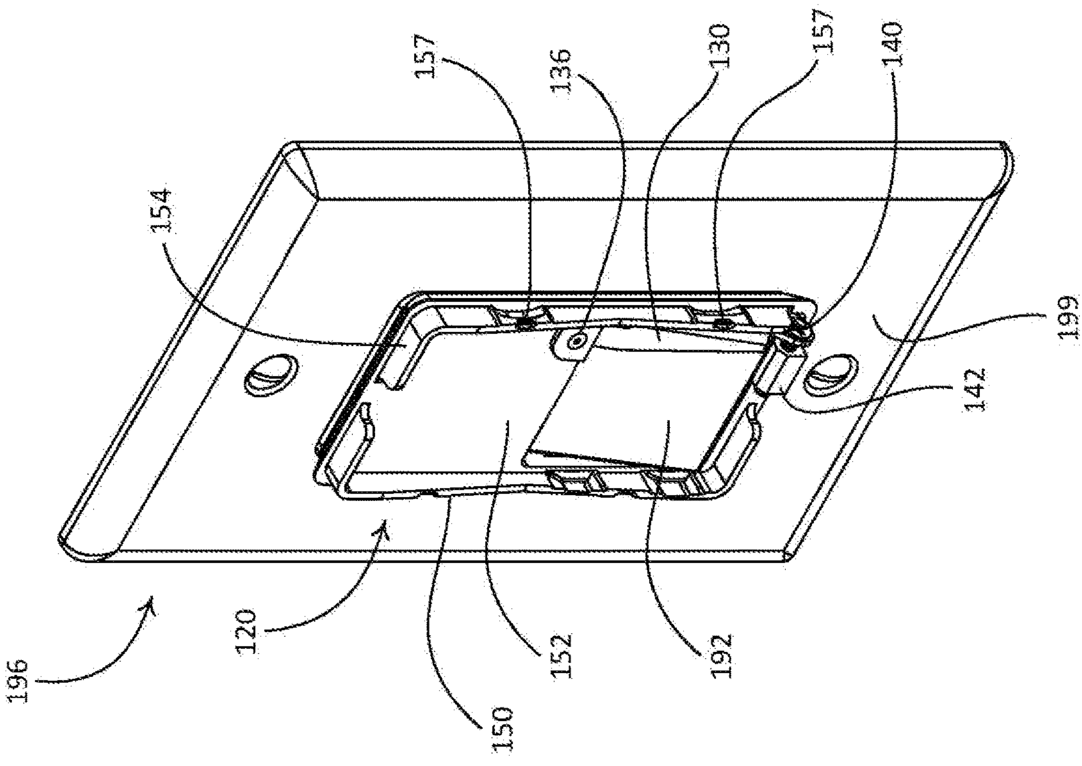
FIG. 2 is a perspective view of an example base component of the example remote control device illustrated in FIG. 1 attached to a paddle actuator of the light switch.
Figure 4:
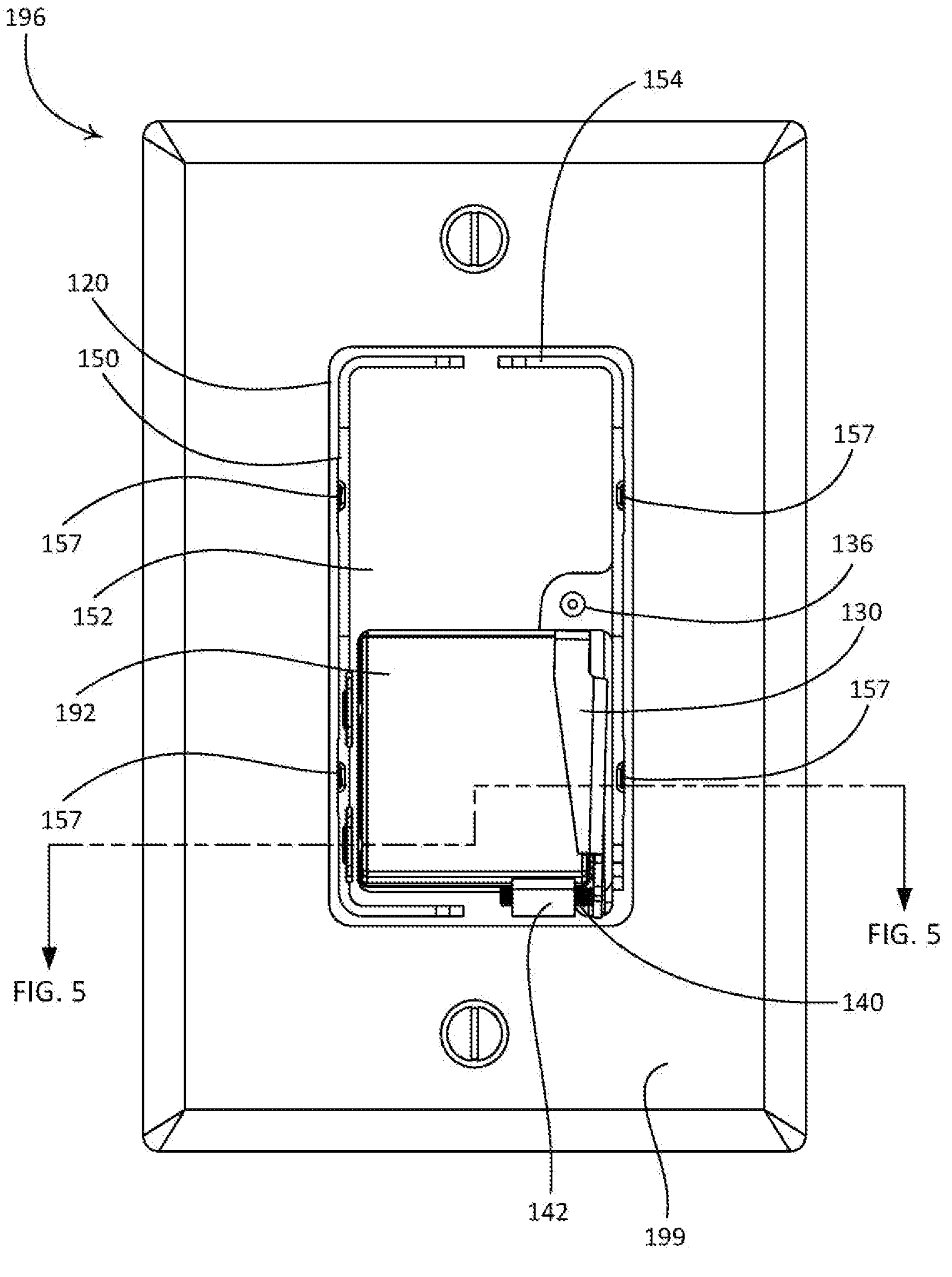
FIG. 4 is a front view of the example base component of the example remote control device illustrated in FIG. 1 attached to the paddle actuator of the light switch.
Figure 5:
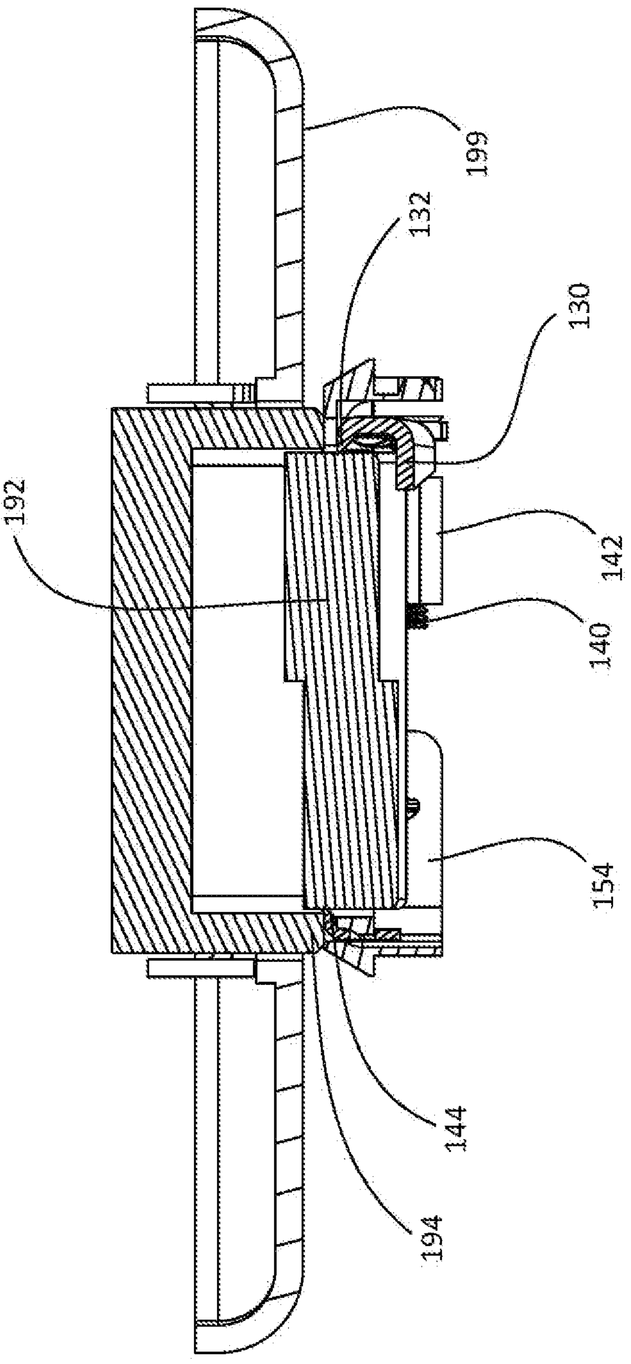
FIG. 5 is a cross-section view of the example base component of the example remote control device illustrated in FIG. 1 attached to the paddle actuator of the light switch.
Figure 6:
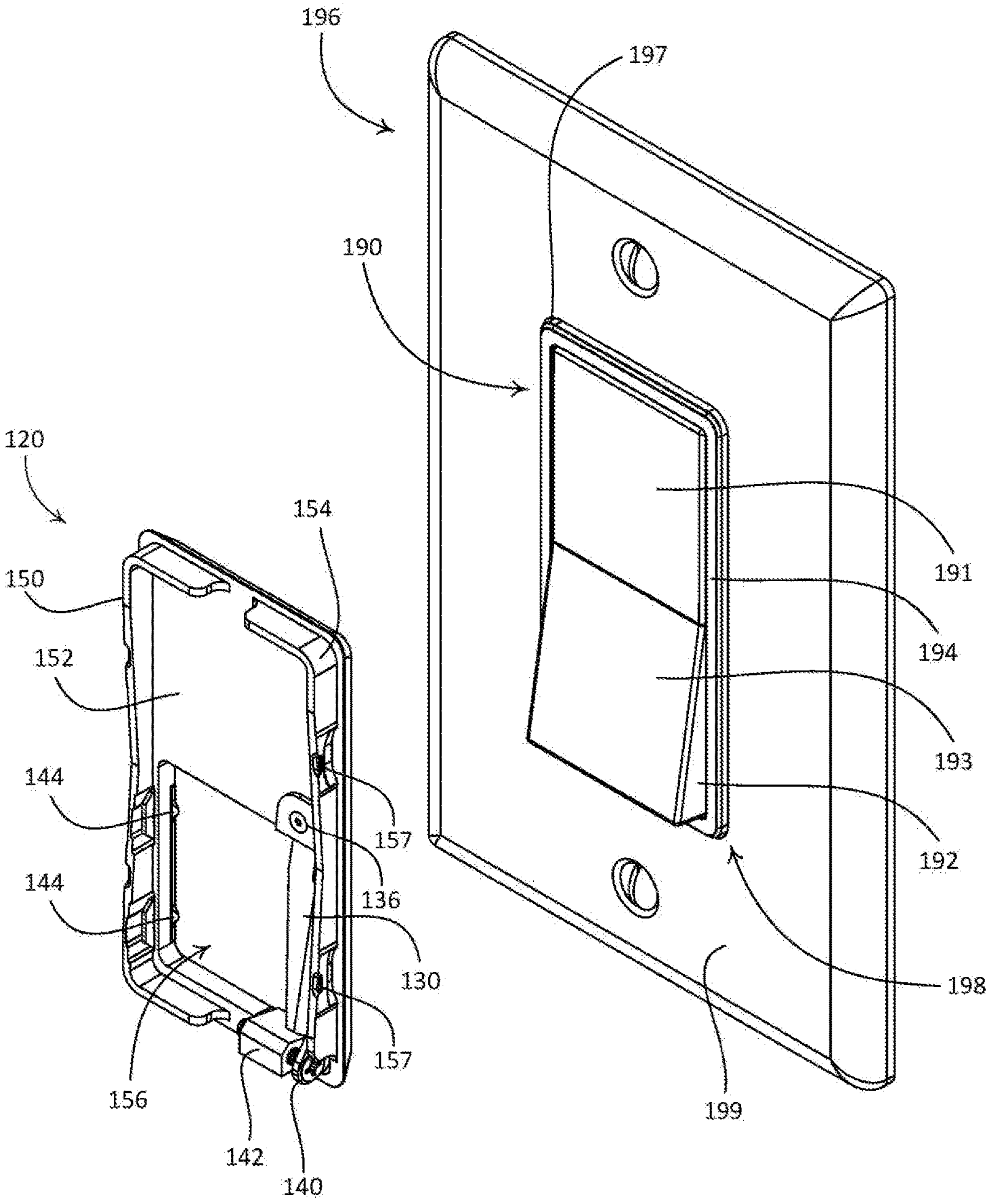
FIG. 6 is a partially exploded view of the example remote control device illustrated in FIG. 1, showing the example base component before being installed to the light switch.
Figure 7:
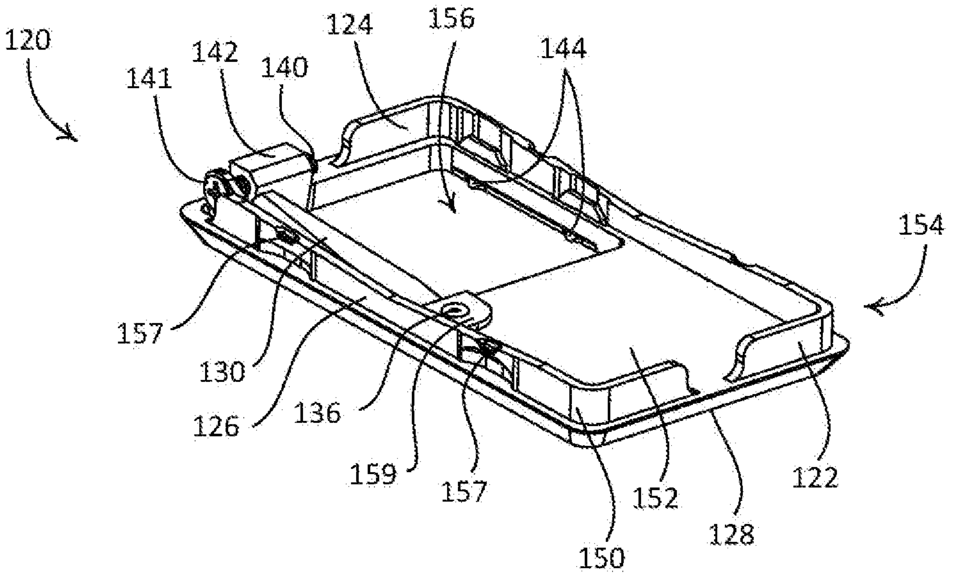
FIG. 7 is a perspective view of the example base component of the example remote control device illustrated in FIG. 1.

With the base 120 attached to the paddle actuator 192 (e.g., as shown in FIGS. 2 and 3), the control unit 110 may be attached to the base 120. For example, the housing 114 of the control unit 110 may be aligned with the base 120 and pressed over the base 120. The housing 114 of the control unit 110 may engage the attachment members 157 defined on the outer wall 154 of the base 120 such that the control unit 110 is removably attached to the base 120.

FIGS. 9-13 depict another example base 220 for a remote control device (e.g., such as the example remote control device 100) that may be installed in a load control system, such as a lighting control system. The load control system may include a mechanical switch, such as the mechanical switch 190, that may be in place prior to installation of the remote control device, for example pre-existing in the load control system. The load control system may further include one or more electrical loads, such as lighting loads. The mechanical switch 190 may be coupled in series electrical connection between an alternating current (AC) power source and the one or more electrical loads (not shown). The load control system may further include a load control device (not shown) that is electrically connected to the one or more electrical loads, as described herein.

As shown, the base 220 may include a clamp arm 230 (e.g., a bar), a screw 240, and a frame 250. The frame 250 may include a plate 252 and an outer wall 254 that extends from the plate 252. The outer wall 254 may extend from a perimeter of the plate 252. The outer wall 254 may be discontinuous along the perimeter of the plate 252. For example, the outer wall 254 may include an end wall 222 and opposed side walls 226. The end wall 222 may not connect to the opposed side walls 226. The base 220 (e.g., the plate 252) may define an edge 224 that is distal from the end wall 222. For example, the base 220 may define terminal edges (e.g., such as the edge 224) that extend between the ends of the opposed side walls 226. The terminal edges of the base 220 may be distal from a midpoint of the mechanical switch 190. The plate 252 may define a rear surface 228 of the base 220.

The frame 250 may define an opening 256. The opening 256 may be configured to receive the protruding portion of the paddle actuator 192, for example, when the base 220 is installed over the mechanical switch 190. The opening 256 may extend through approximately a lower half of the plate 252. The base 220 may define one or more teeth 244. The teeth 244 may extend into the opening 256. For example, the teeth 244 may extend into the opening 256 proximate to the rear surface 228 of the base 220. The teeth 244 may be configured to engage a side of the protruding portion of the paddle actuator 192. The base 220 may define a sleeve 242 that is configured to receive the screw 240. The sleeve 242 may include internal threads that cooperate with the threads of the screw 240. The sleeve 242 may be located proximate to the edge 224. Although the sleeve 242 is located near a midpoint of the edge 224 of the base 220 in FIGS. 9-13, it should be appreciated that the sleeve 242 may be biased towards a side wall of the base (e.g., one of the opposed side walls 226 of the frame 250) that is distal from or proximate to the clamp arm 230 or located at another location along the edge 224 of the base 220. A length of the screw 240 may be configured based on the location of the sleeve 242 along the edge 224 of the base 220. Although the sleeve 242 is located along the edge 224 of the base 220, it should be appreciated that the sleeve 242 is not limited to being located at the edge 224 of the base 220 and may be located at other locations of the base 220.

The outer wall 254 may define a plurality of attachment members (not shown). For example, each of the opposed side walls may include on or more attachment members. The attachment members may be configured to engage corresponding features of a control unit (e.g., such as the control unit 110) such that the control unit can be releasably attached to the base 220. The attachment members may be resilient snap-fit connectors (e.g., snaps, such as the attachment members 157 configured to engage the corresponding features of the housing 114 of the control unit 110). The outer wall 254 of the base 220 may be configured to provide a friction fit with the control unit. For example, the outer wall 254 may be sized and/or may include one or more features such that corresponding walls of the housing 114 of the control unit and/or corresponding features are secured to the base 220 using friction.

The clamp arm 230 may be configured to secure (e.g., attach) the base 220 to the protruding portion of the paddle actuator 192 of the mechanical switch 190. For example, as shown the clamp arm 230 may be configured to apply a force on the protruding portion of the paddle actuator 192 as the screw 240 is driven into the sleeve 242. The clamp arm 230 may define a hole 234 that is configured to receive the screw 240. The clamp arm 230 may define a plate 231. A distal end 241 of the screw 240 may be configured to abut the plate 231 of the clamp arm 230 as the screw 240 is driven into the sleeve 242. For example, the distal end 241 of the screw 240 may apply a force upon the plate 231 as the screw 240 is driven into the sleeve 242. The clamp arm 230 may include one or more teeth, for example, such as the tooth 232 shown in FIG. 13. The tooth 232 may extend from the clamp arm 230 and into the opening 256. The tooth 232 may be configured to engage (e.g., bite into) the protruding portion of the paddle actuator 192. Although shown as having a triangular prism-like shape, it should be appreciated that the tooth 232 may define various shapes, for example, such as a cylinder-like shape, a cone-like shape, a pyramid-like shape, and/or another similar shape.

The clamp arm 230 may be pivotally attached to the base 220. For example, the base 220 may define a pivot joint 236 therethrough. The pivot joint 236 may be located proximate to the edge 224 of the frame 250. The clamp arm 230 may be connected to the frame 250 (e.g., the plate 252) at the pivot joint 236. The pivot joint 236 may be configured to enable operation of the clamp arm 230 between a disengaged position and an engaged position with the protruding portion of the paddle actuator 192. For example, the clamp arm 230 may pivot about the pivot joint 236 as the screw 240 is rotated within the sleeve 242. The disengaged position may be defined as the clamp arm 230 being located proximate to the outer wall 254. The engaged position may be defined as the clamp arm 230 being located distal from the outer wall 254 and/or over the opening 256. Clockwise rotation of the screw 240 may pivot the clamp arm 230 from the disengaged position to the engaged position. Counter-clockwise rotation of the screw 240 may pivot the clamp arm 230 from the engaged position to the disengaged position. The pivot joint 236 may be a revolute joint (e.g., such as a pin joint or a hinge joint) having a pin that extends through the clamp arm 230 and the base 220. The pivot joint 236 may be configured to enable the clamp arm 230 to rotate about the pin (e.g., an axis defined by the pin). Alternatively, the pivot joint 236 may be a cylindrical joint, a spherical joint, a saddle joint, or another similar joint.

In accordance with the illustrated configuration of the base 220, the frame 250 may be configured such that the rear surface 228 of the base 220 abuts the bezel 194 and may not contact the outer surface 199 of the faceplate 196. It should be appreciated that the outer wall 254 of the frame 250 is not limited to the illustrated geometry. For example, the frame 250 may be alternatively configured such that the outer wall 254 surrounds the bezel 194 and at least a portion of the rear surface 228 of the base 220) abuts the outer surface 199 of the faceplate 196 when the base 220 is attached to the protruding portion of the paddle actuator 192. In another example, the frame 250 may be alternatively configured such that the outer wall 254 encloses the faceplate 196 of the mechanical switch 190, for instance such that the rear surface 228 of the base 220 abuts a surface of a structure in which the mechanical switch 190 is installed, such as a surface of a wall.

The base 220 and the control unit may be configured to enable releasable attachment of the control unit to the base 220. For example, one or more components of the base 220 may include engagement features that may be configured to engage with complementary engagement features of the control unit.

In an example process of attaching the base 220 to the paddle actuator 192 of the mechanical switch 190, the base 220 may be placed over the paddle actuator 192 such that the protruding portion of the paddle actuator extends through the opening 256. The clamp arm 230 may be in the disengaged position when the base 220 is placed over the paddle actuator 192. The rear surface 228 of the base 120 may abut the outer surface 199 of the faceplate 196 and/or the bezel 194 of the mechanical switch 190 when the base 220 is placed over the paddle actuator 192. The screw 240 may be operated such that the threads of the screw 240 engage the internal threads of the sleeve 242. When the screw 240 is operated (e.g., clockwise), the distal end 241 of the screw 240 may abut the plate 231 of the clamp arm 230 and the clamp arm 230 may pivot about the pivot joint 236 such that the clamp arm 230 moves toward the protruding portion of the paddle actuator 192. As the screw 240 is further operated (e.g., clockwise), the clamp arm 230 may abut the protruding portion of the paddle actuator 192. The clamp arm 230 and/or the teeth 232, 244 may apply a force upon the protruding portion of the paddle actuator 192. For example, the tooth 232 and the teeth 244 may captively engage (e.g., bite into) the protruding portion of the paddle actuator 192 as the screw 240 is further operated. The base 220 may be secured to the protruding portion of the paddle actuator 192 when the tooth 232 and the teeth 244 captively engage (e.g., bite into) the protruding portion of the paddle actuator 192.

Figure 10:
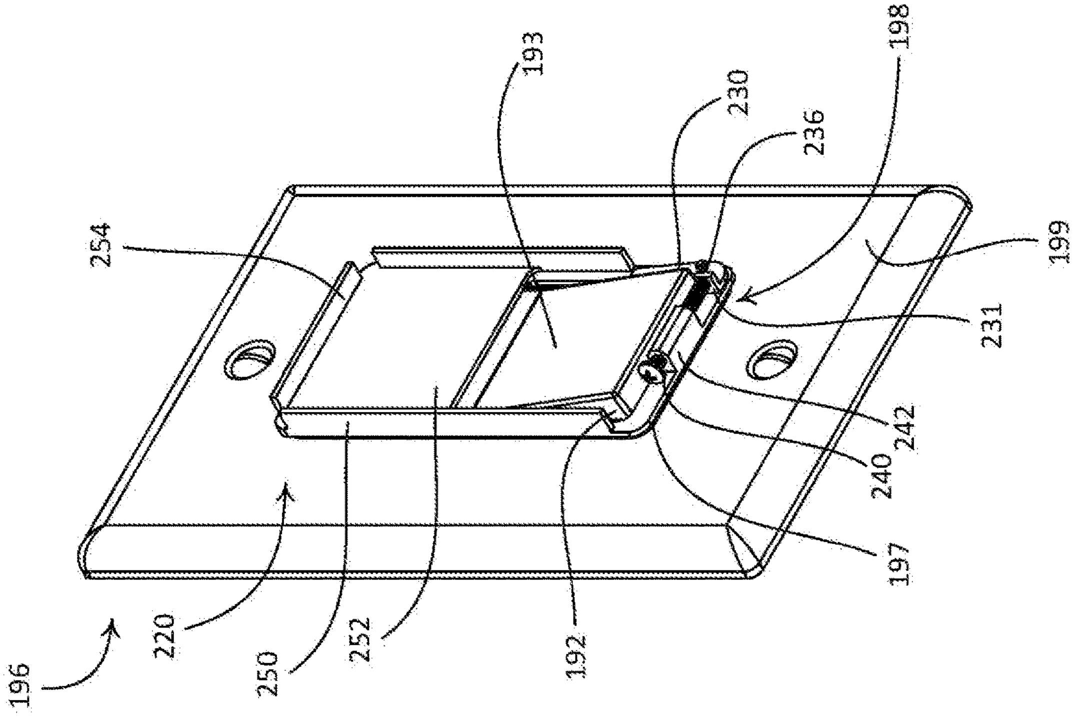
FIG. 10 is another perspective view of the alternate base component of the example remote control device illustrated in FIG. 1 attached to a paddle actuator of the light switch.
Figure 9:
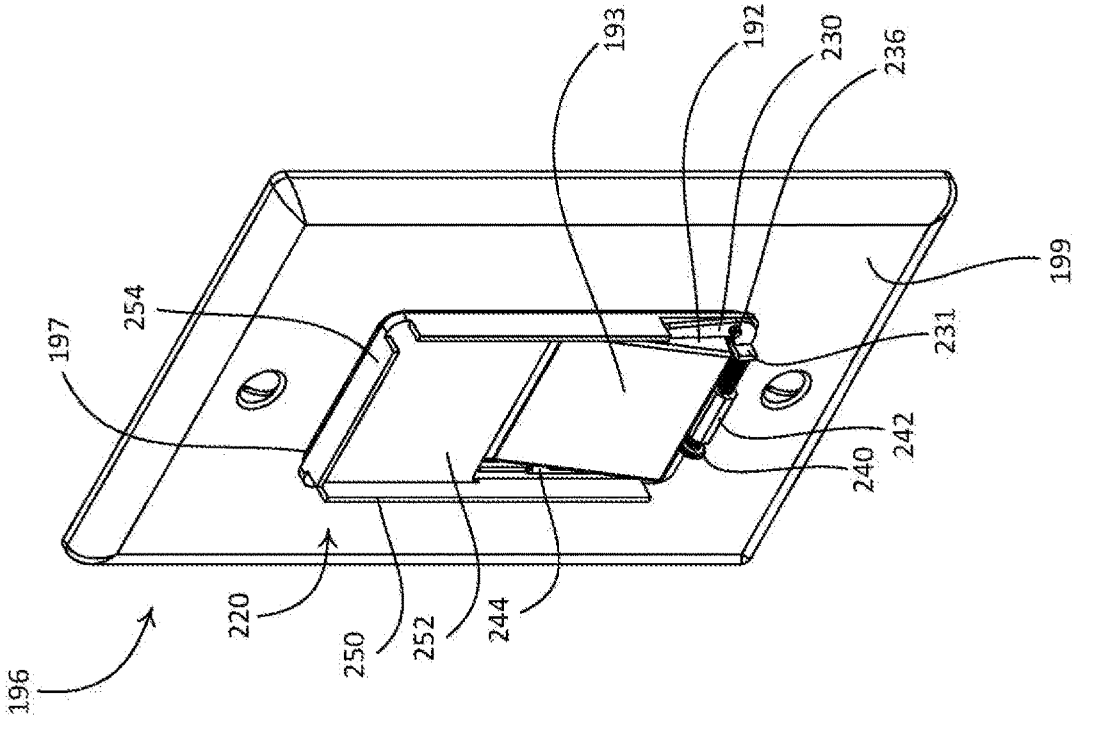
FIG. 9 is a perspective view of an alternate base component of the example remote control device illustrated in FIG. 1 attached to a paddle actuator of the light switch.
Figure 11:
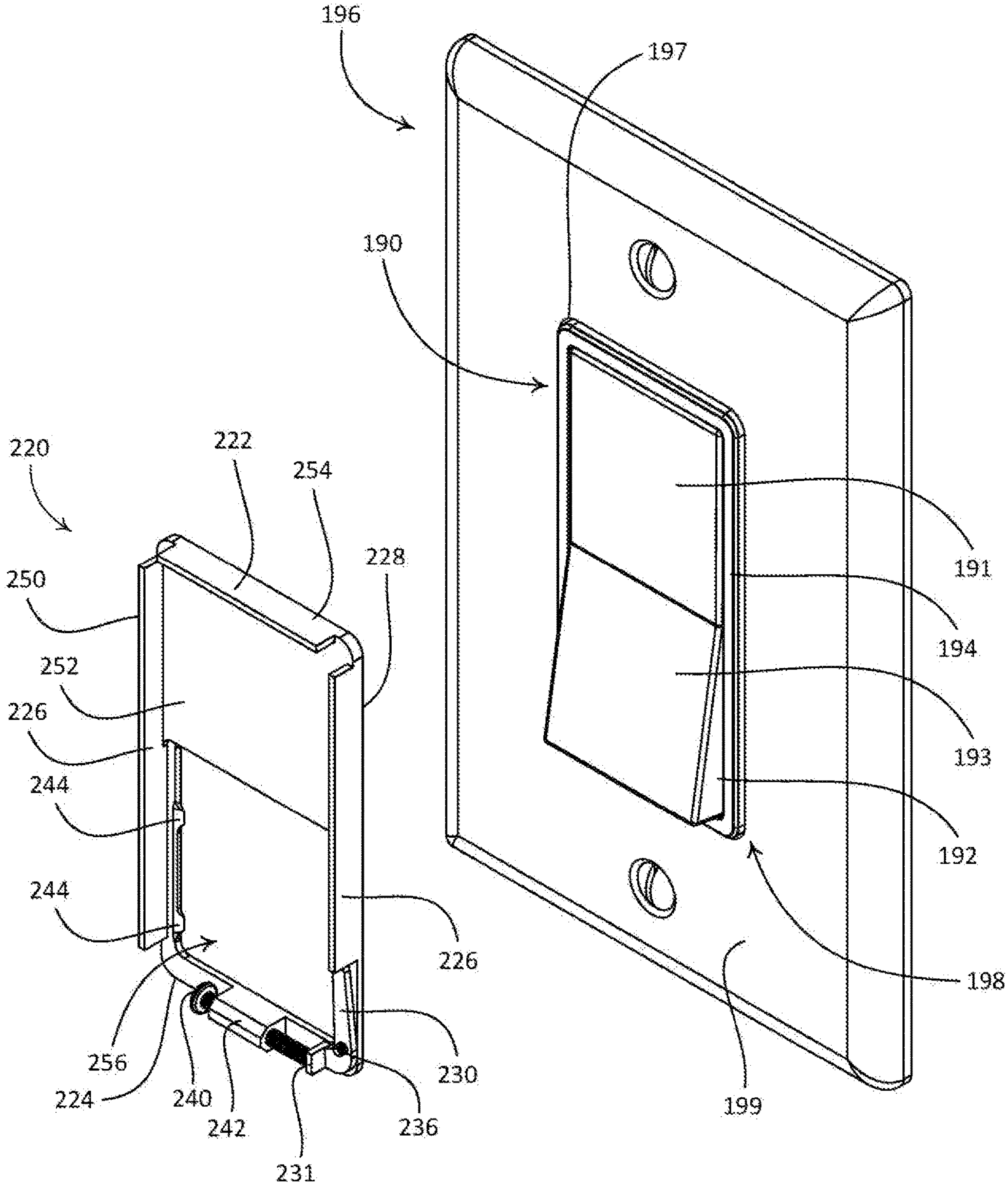
FIG. 11 is a partially exploded view of the example remote control device illustrated in FIG. 1, showing the alternate base component before being installed to the light switch.
Figure 12:
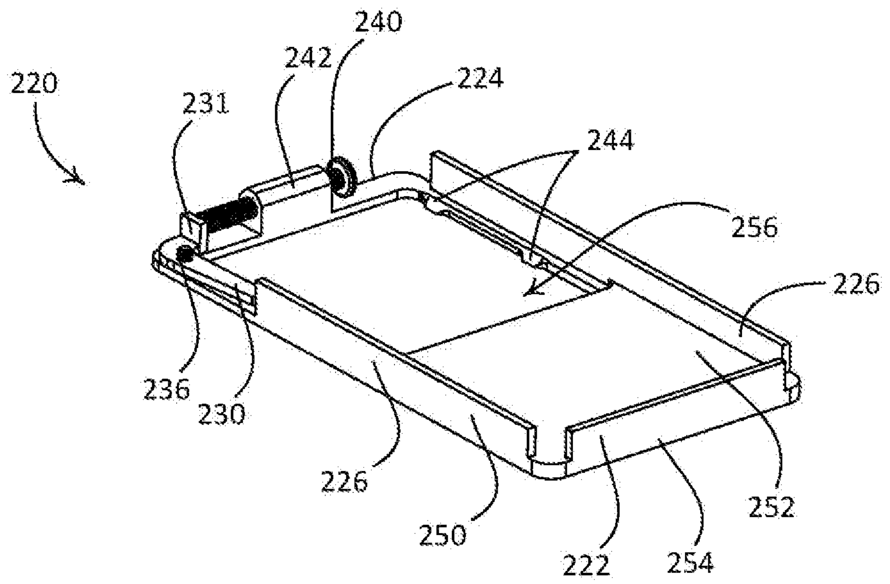
FIG. 12 is a perspective view of the alternate base component shown in FIG. 9.
Figure 13:
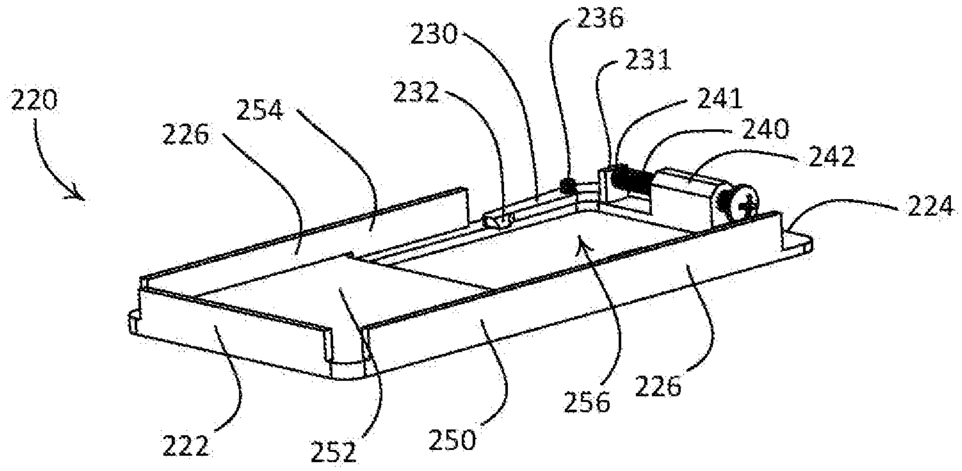
FIG. 13 is another perspective view of the alternate base component shown in FIG. 9.

With the base 220 attached to the paddle actuator 192 (e.g., as shown in FIGS. 9 and 10), the control unit may be attached to the base 220. For example, the control unit 110 may be aligned with the base 220 and pressed over the base 220. The housing 114 of the control unit 110 may engage the attachment members defined on the outer wall 254 of the base 220 such that the control unit 110 is removably attached to the base 220. Alternatively, the walls of the housing 114 of the control unit 110 may engage the outer wall 254 of the base 220 such that friction secures the control unit 110 to the base 220.

FIGS. 14-18 depict another example remote control device 300 that may be installed in a load control system, such as a lighting control system. The load control system may include a mechanical switch, such as the mechanical switch 190, that may be in place prior to installation of the remote control device 300, for example pre-existing in the load control system. The load control system may further include one or more electrical loads, such as lighting loads. The mechanical switch 190 may be coupled in series electrical connection between an alternating current (AC) power source and the one or more electrical loads (not shown), such as a controllable light source. The load control system may further include one or more load control devices (not shown) that are electrically connected to the one or more electrical loads and/or integral to the one or more electrical loads, as described herein.

As shown, the example remote control device 300 may include a control unit 310 and a base 320 (e.g., such as the base 120 depicted in FIGS. 2-8 or the base 220 depicted in FIGS. 9-13) that may operate as a mount for the control unit 310. The base 320 may alternatively be referred to as a base portion or a mounting assembly. The control unit 310 and the base 320 may be configured such that the control unit 310 may be removably attached to the base 320. The base 320 may be attached to the paddle actuator 192 of the mechanical switch 190 without removing the faceplate 196. In this regard, the remote control device 300 may be mounted over an installed mechanical switch, such as the mechanical switch 190, without the need to remove the faceplate 196 and/or perform any electrical re-wiring of the mechanical switch 190.

The control unit 310 may be configured to function similarly to the control unit 110. For example, the control unit 310 may include a user interface comprising an actuation portion 312 that may be attached (e.g., fixedly attached) to a housing 314. The actuation portion 312 may include a front surface 315 having an upper portion 316 and a lower portion 318. The front surface 315 of the actuation portion 312 may be configured as a touch sensitive surface (e.g., a capacitive touch surface) that is configured to receive (e.g., detect) inputs, such as touches or gestures, from a user of the control unit 310. The control unit 310 may be configured to control an electrical load to turn the electrical load on in response to an actuation (e.g., a touch) of the upper portion 316 and to turn the electrical load off in response to an actuation (e.g., a touch) of the lower portion 318. The control unit 310 may also include a light bar 319 configured to be illuminated by one or more light sources (e.g., one or more LEDs) to visibly display information. The light bar 319 may be biased toward one side of the control unit 310. The control unit 310 may be configured to adjust the amount of power delivered to the electrical load in response to an actuation (e.g., a touch) along the light bar 319 (e.g., according to the position of the actuation along the light bar).

The control unit 310 may be battery-powered. The control unit 310 may be configured to receive a battery 360 for powering electrical circuitry of the control unit 310. For example, the control unit 310 may define a void 330. For example, a rear surface 332 of the control unit 310 may define the void 330. The void 330 may be configured to receive a PCB 340 of the remote control device 300. The control unit 310 may comprise a battery holder 362 (e.g., a battery clamp). The battery holder 362 may be electrically conductive and may be mounted to the PCB 340. The PCB 340 may include one or more electrical contacts (e.g., such as electrical contact pads 374, 376). The battery holder 362 may define a first arm 364, a second arm 366, and mounting flanges 368. The first arm 364 may extend from the mounting flanges 368 in a first direction. The second arm 366 may extend from the mounting flanges 368 in a second direction. The second direction may be opposed to the first direction. The first arm 364 and the second arm 366 may be compliant members. For example, the first arm 364 and the second arm 366 may be biased toward the PCB 340 such that they are configured to apply a force upon the battery 360 to secure the battery 360 within the battery holder 360.

Figure 16:
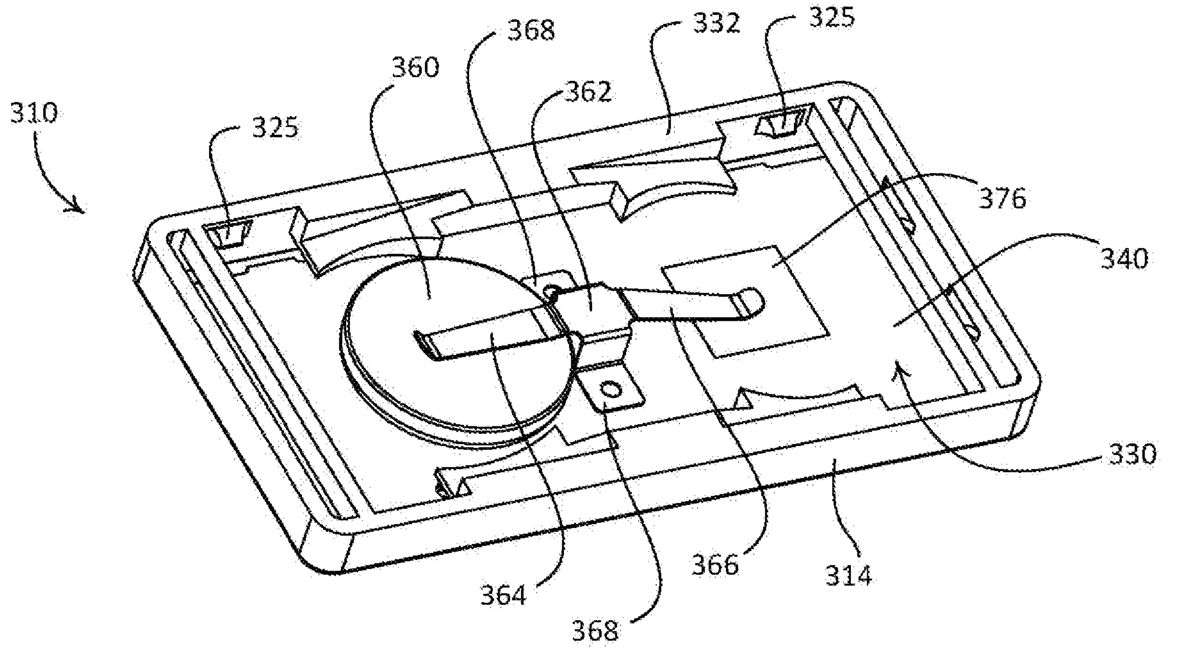
FIG. 16 is a rear perspective view of an example control unit illustrating a battery clamp configuration with the battery installed in a first position.
Figure 17:
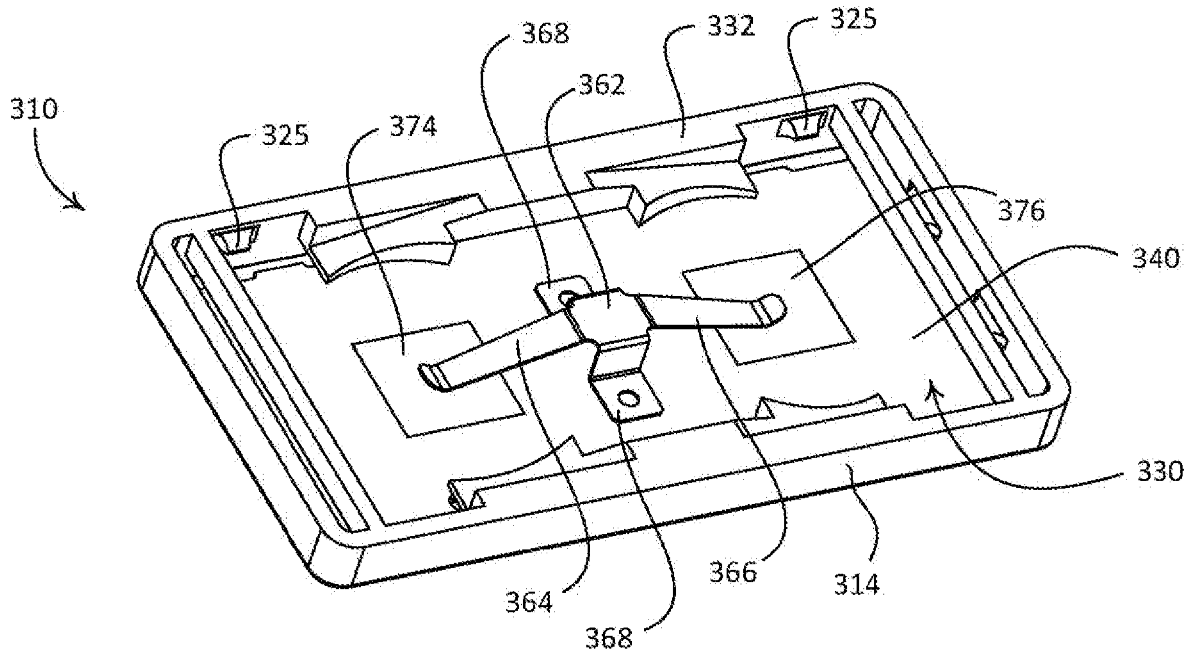
FIG. 17 is another rear perspective view of the example control unit shown in FIG. 16 without the battery installed.

The battery holder 362 may be configured to receive a single battery (e.g., battery 360) in one of two positions for powering the electrical circuitry of the control unit 310. The first arm 364 may be configured to secure the battery 360 in a first position within the battery holder 362. The second arm 366 may be configured to secure the battery 360 in a second position within the battery holder 362. For example, the first position may be defined as the first arm 364 securing the battery 360 against the electrical contact pad 374, for example, as shown in FIG. 16. The second position may be defined as the second arm 366 securing the battery 360 against the electrical contact pad 376. The first arm 364 may operate as an electrical contact when the battery 360 is secured against the electrical contact pad 374, and the second arm 366 may operate as an electrical contact when the battery 360 is secured against the electrical contact pad 376. The mounting flanges 368 may be configured to attach (e.g., mechanically and electrically couple) the battery holder 362 to the PCB 340. Each of the mounting flanges 368 may be fastened to the PCB 340, for example, using fasteners, solder, adhesive, and/or the like. For example, the battery 360 may be coupled to the electrical circuitry of the control unit 310 through the PCB 340 (e.g., via the battery holder 362 and/or the electrical contact pads 374, 376).

Figure 14:
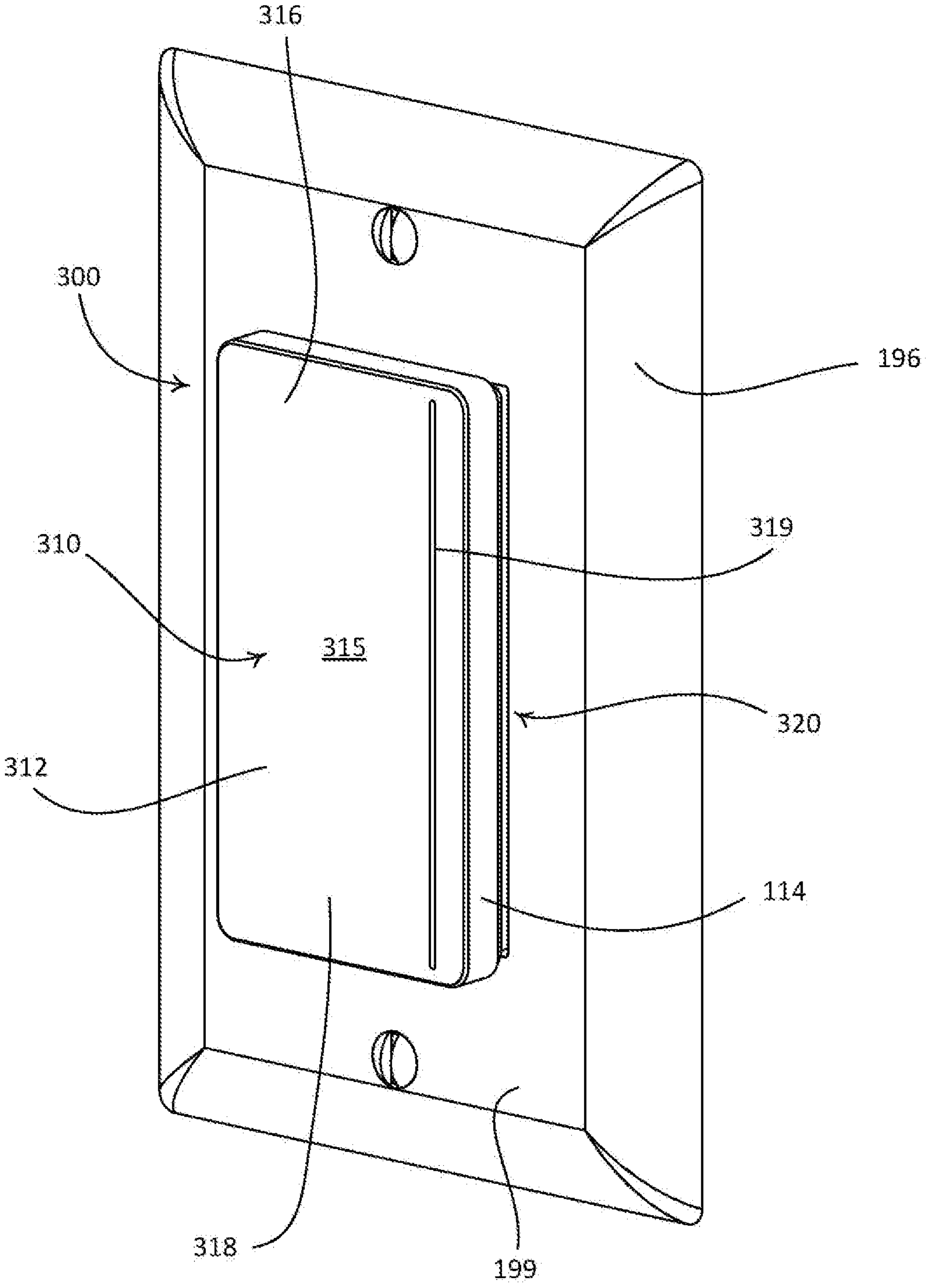
FIG. 14 is a perspective view of an example remote control device having an alternate control unit configuration.

The control unit 310 may be configured to be attached to the base 320 with the light bar 319 located on a predetermined side of the control unit (e.g., the right side of the control unit as shown in FIG. 14), such that the light bar 319 may be illuminated to indicate, for example, the amount of power presently being delivered to the electrical load. The control unit 310 may be configured to be attached to the base 320 with the light bar 319 located on a predetermined side of the control unit independent of a position of the paddle actuator 192 of the mechanical switch 190 (e.g., whether the upper portion or the lower portion of the paddle actuator 192 is protruding from the bezel 194).

Figure 18:
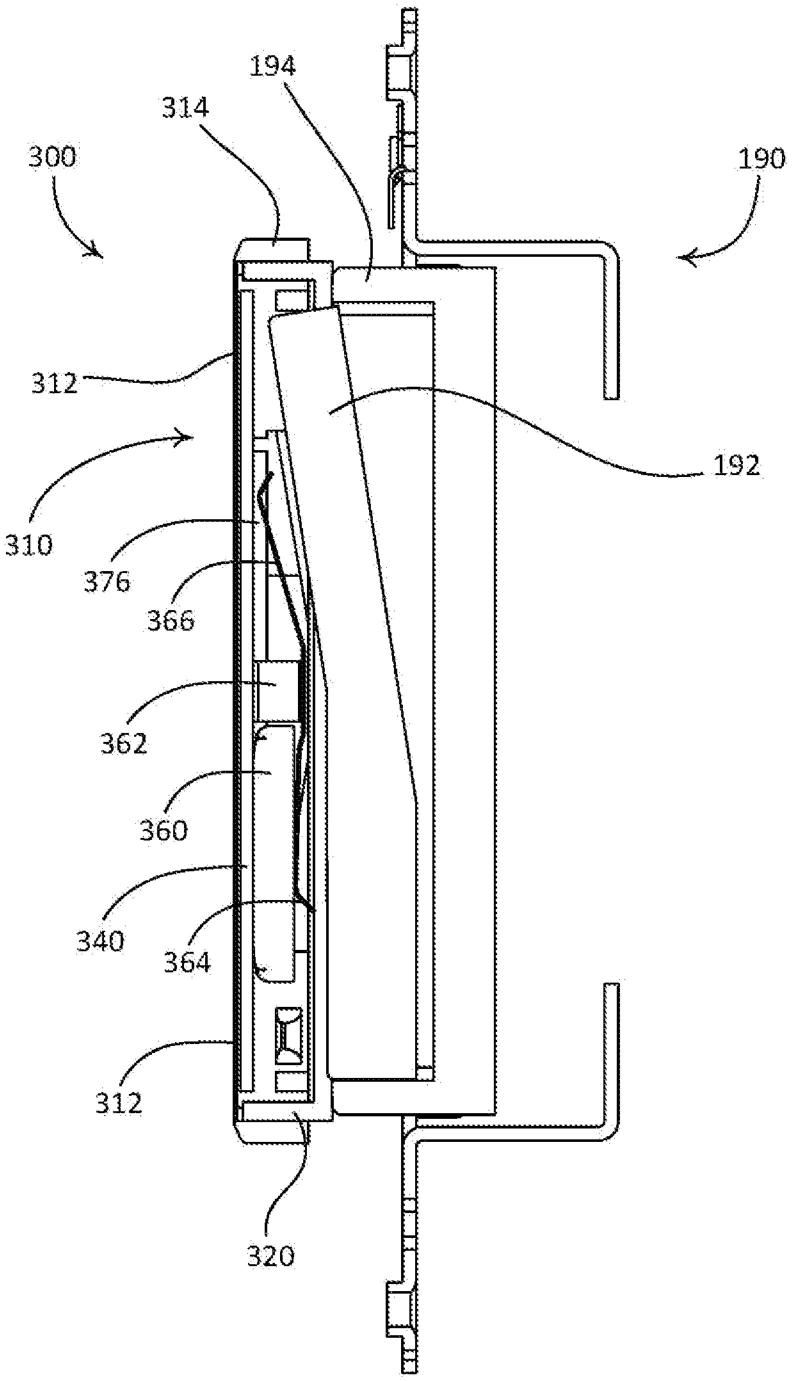
FIG. 18 is a cross-section view of the example control unit shown in FIG. 16 mounted to a light switch and illustrating the battery located in the first position.
Figure 19:
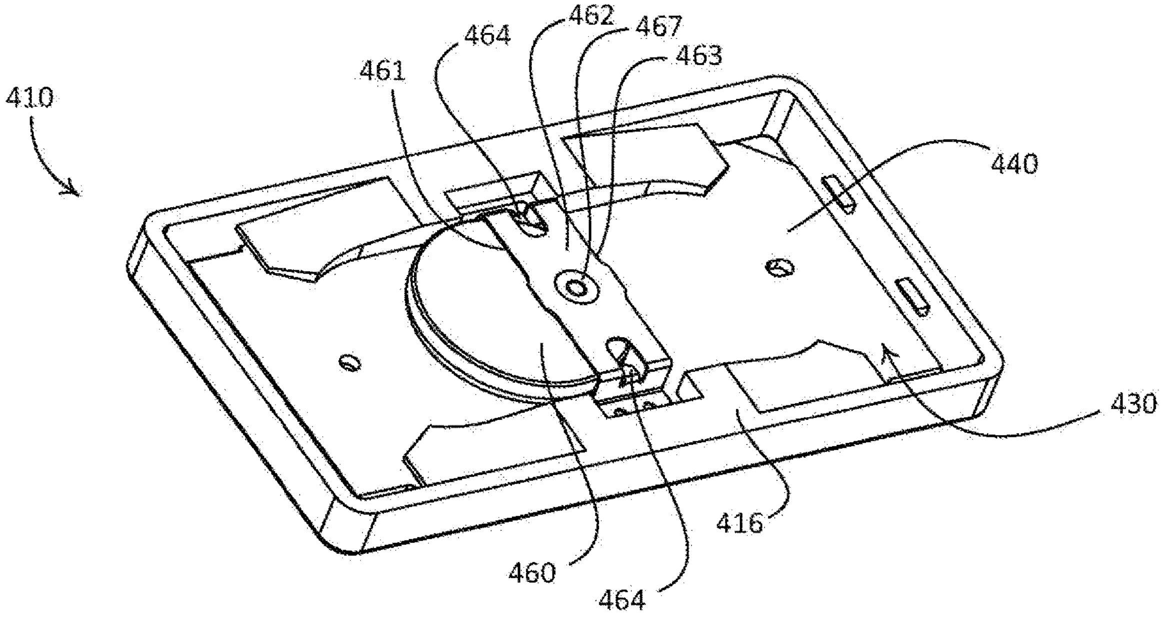
FIG. 19 is a rear perspective view of another example control unit illustrating an alternate battery clamp configuration with the battery installed in a first position.
Figure 20:
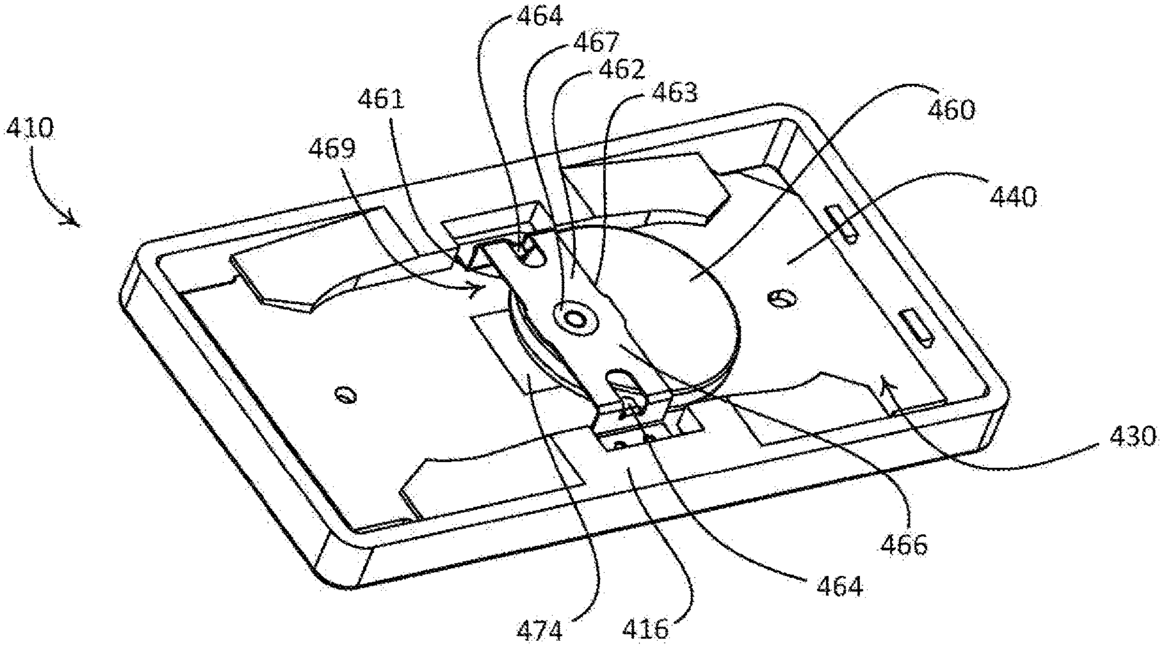
FIG. 20 is a rear perspective view of the example control unit shown in FIG. 19, illustrating the alternate battery clamp configuration with the battery installed in a second position.

The battery 360 may be configured to be installed in the control unit 310 based on the position of the paddle actuator 192 when power is being delivered to the electrical load(s) associated with the mechanical switch 190. The battery 360 may be installed within the battery holder 362 in an orientation that corresponds to the position of the mechanical switch 190. For example, the battery 360 may be installed using the first arm 364 in a first position (e.g., secured against the electrical contact pad 374). The first position may correspond to the upper portion of the paddle actuator 192 protruding into the void 330 (e.g., as shown in FIG. 18). The battery 360 may be installed using the second arm 366 in a second position (e.g., secured against the electrical contact pad 376). The second position may correspond to a lower portion of the paddle actuator 192 protruding into the void 330.

Figure 15:
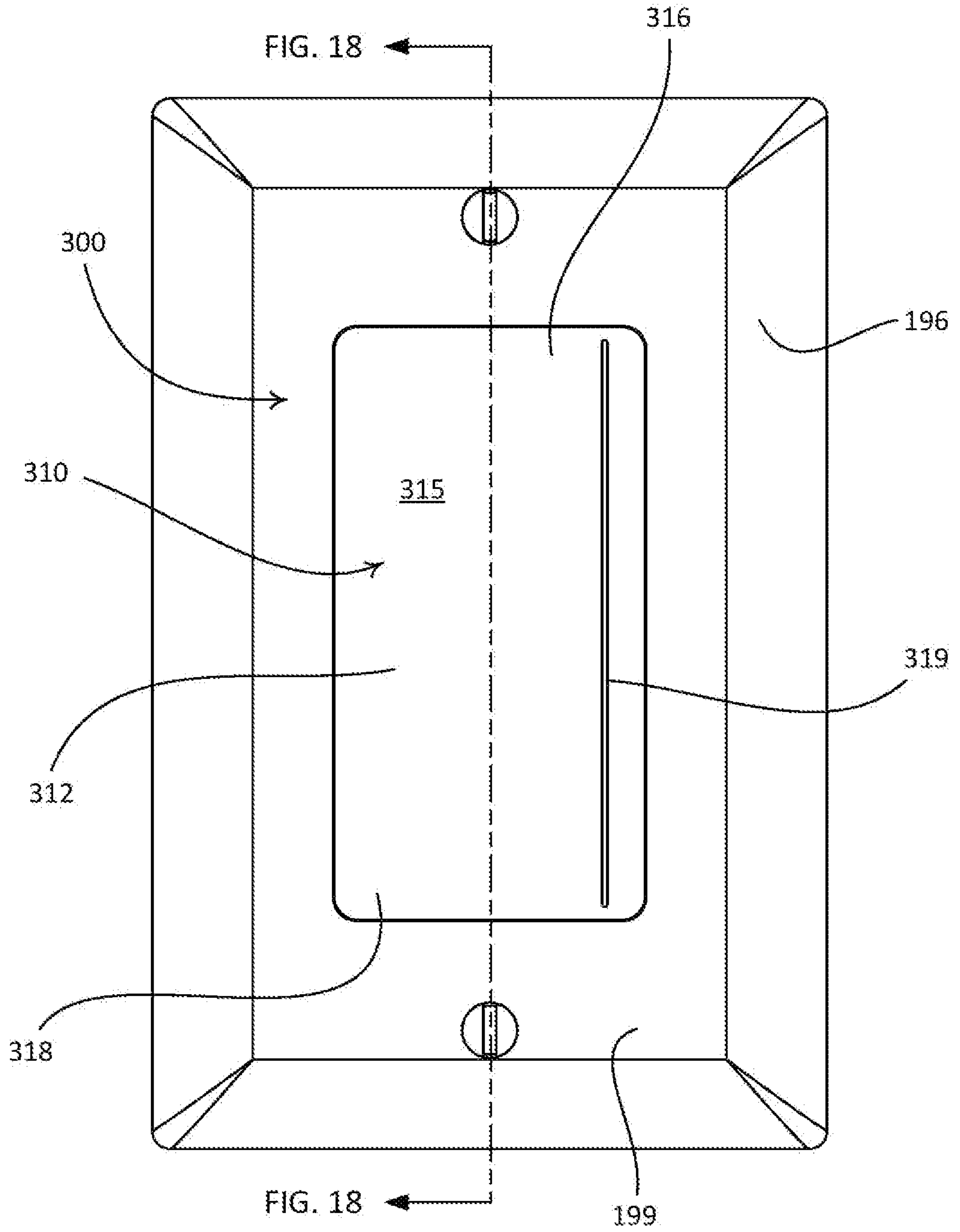
FIG. 15 is a front view of the example remote control device shown in FIG. 14 having an alternate control unit configuration.

The base 320 may be configured to be secured to the protruding portion of the paddle actuator 192 (e.g., such as the base 120 and/or the base 220). As the base 320 is secured to the protruding portion of the paddle actuator 192, a rear surface of the base 320 may be biased against the bezel 194 of the mechanical switch 190. With the base 320 attached to the paddle actuator 192 (e.g., as shown in FIG. 15), the control unit 310 may be attached to the base 320.

The base 320 may be configured to enable releasable attachment of the control unit 310 to the base 320. For example, one or more components of the base 320 may include engagement features (e.g., such as the attachment members 157 of the control unit 110) that may be configured to engage with complementary engagement features of the control unit 310. For example, the control unit 310 may define snaps 325 (e.g., resilient snap-fit connectors). The snaps 325 may extend into the void 330. The snaps 325 may be configured to secure the control unit 310 to the base 320.

FIGS. 19-24 depict another remote control device 400 having a control unit 410 with an alternate battery holder 462. The control unit 410 may have a user interface the same as or similar to the user interface of the control unit 310 shown in FIG. 14. The control unit 410 may be mounted to a base 420 (e.g., such as the base 120 depicted in FIGS. 2-8 or the base 220 depicted in FIGS. 9-13). The base 420 may alternatively be referred to as a base portion or a mounting assembly. The control unit 410 and the base 420 may be configured such that the control unit 410 may be removably attached to the base 420. The base 420 may be attached to the paddle actuator 192 of the mechanical switch 190 without removing the faceplate 196. In this regard, the remote control device 400 may be mounted over an installed mechanical switch, such as the mechanical switch 190, without the need to remove the faceplate 196 and/or perform any electrical re-wiring of the mechanical switch.

The base 420 may be configured to enable releasable attachment of the control unit 410 to the base 420. For example, one or more components of the base 420 may include engagement features (e.g., such as the attachment members 157 of the control module 110) that may be configured to engage with complementary engagement features of the control unit 410. For example, the control unit 410 may define snaps (e.g., resilient snap-fit connectors). The snaps may be configured to secure the control unit 410 to the base 420.

The control unit 410 may be battery-powered. The control unit 410 may be configured to receive a battery 460 for powering electrical circuitry of the control unit 410. For example, the control unit 410 may define a void 430. For example, a rear surface 416 of the control unit 410 may define the void 430. The void 430 may be configured to receive a PCB 440 of the remote control device 400. The PCB 440 may include one or more electrical contact pads (e.g., such as electrical contact pad 474). The battery holder 462 of the control unit 410 may be electrically conductive and may be mounted to the PCB 440. The battery holder 462 may define mounting flanges 468 and an electrical contact member 466. The electrical contact member 466 may extend between the mounting flanges 468 to define a slot 469. The slot 469 may be defined by the electrical contact member 466, the mounting flanges 468, and the PCB 440. The slot 469 may be configured to receive the battery 460 therein.

The battery holder 462 (e.g., the electrical contact member 466) may further define one or more apertures 465 and one or more tabs 464. The tabs 464 may be located at the apertures 465, respectively. The tabs 464 may extend into the slot 469. The tabs 464 may be located approximately at a midpoint of the PCB 440, for example, such that the tabs 464 are configured to engage the battery 460 when the battery 460 is installed within the battery holder 462. The battery holder 462 may be configured to secure the battery 460 against the electrical contact pad 474. The tabs 464 may be configured to prevent the battery 460 from being installed in the battery holder 462 beyond a predefined location. For example, the tabs 464 may be configured such that the battery 460, when installed, does not interfere with the paddle actuator 192 of the mechanical switch 190.

The mounting flanges 468 may be configured to attach (e.g., mechanically and electrically couple) the battery holder 462 to the PCB 440. Each of the mounting flanges 468 may be fastened to the PCB 440, for example, using fasteners, solder, adhesive, and/or the like. For example, the battery 460 may be coupled to the electrical circuitry of the control unit 410 through the PCB 440 (e.g., via the battery holder 462 and/or the electrical contact pad 474).

The control unit 410 may include a light bar (e.g., the light bar 319 of the control unit 310 shown in FIG. 14). The light bar may be biased to one side of the control unit 410. The control unit 410 may be configured to be attached to the base 420 with the light bar located on a predetermined side of the control unit (e.g., the right side), such that the light bar may be illuminated to indicate, for example, the amount of power presently being delivered to the electrical load. The control unit 410 may be configured to be attached to the base 420 with the light bar located on a predetermined side of the control unit independent of a position of the paddle actuator 192 of the mechanical switch 190 (e.g., whether the upper portion or the lower portion of the paddle actuator 192 is protruding from the bezel 194).

Figure 22:
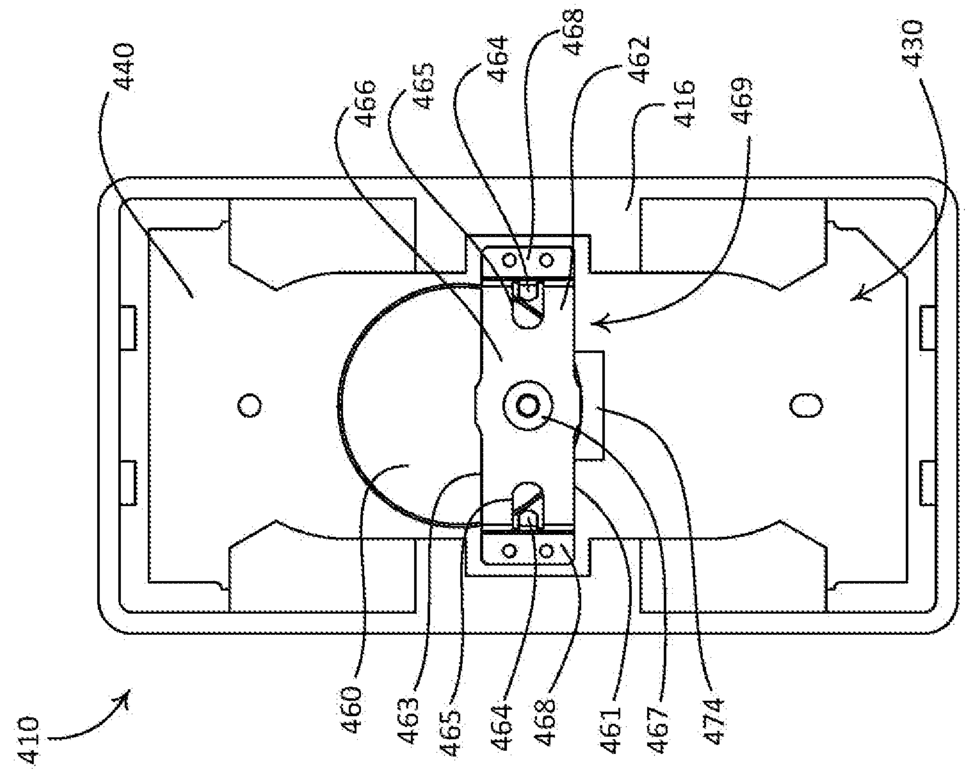
FIG. 22 is a rear view of the example control unit shown in FIG. 19, illustrating the alternate battery clamp configuration with the battery installed in the second position.
Figure 21:
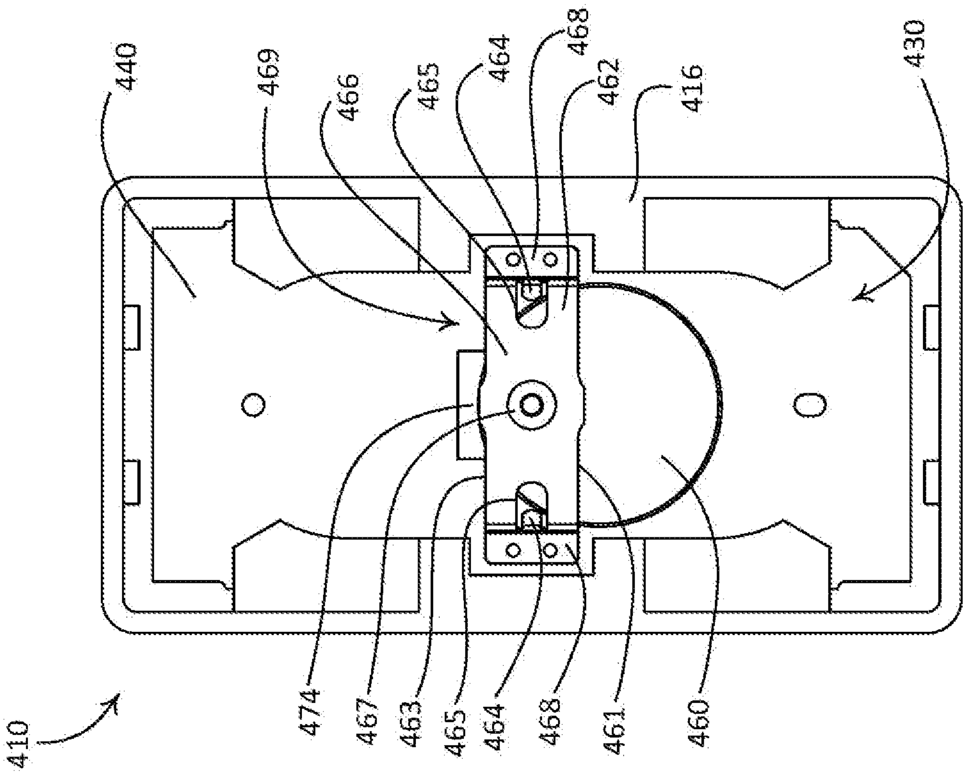
FIG. 21 is a rear view of the example control unit shown in FIG. 19, illustrating the alternate battery clamp configuration with the battery installed in the first position.
Figure 23:
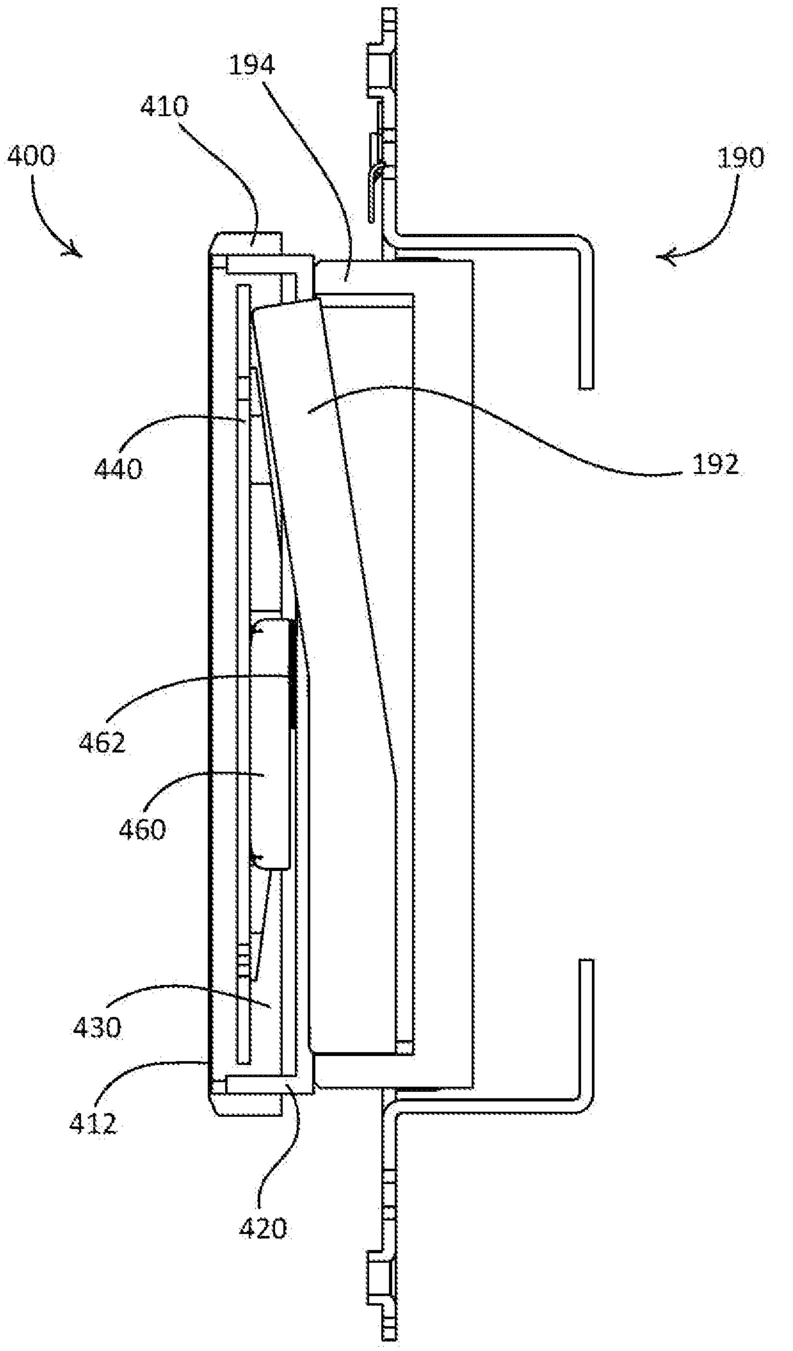
FIG. 23 is a cross-section view of the example control unit shown in FIG. 19 mounted to a light switch and illustrating the battery in the first position in relation to the paddle actuator of the mechanical switch.
Figure 24:
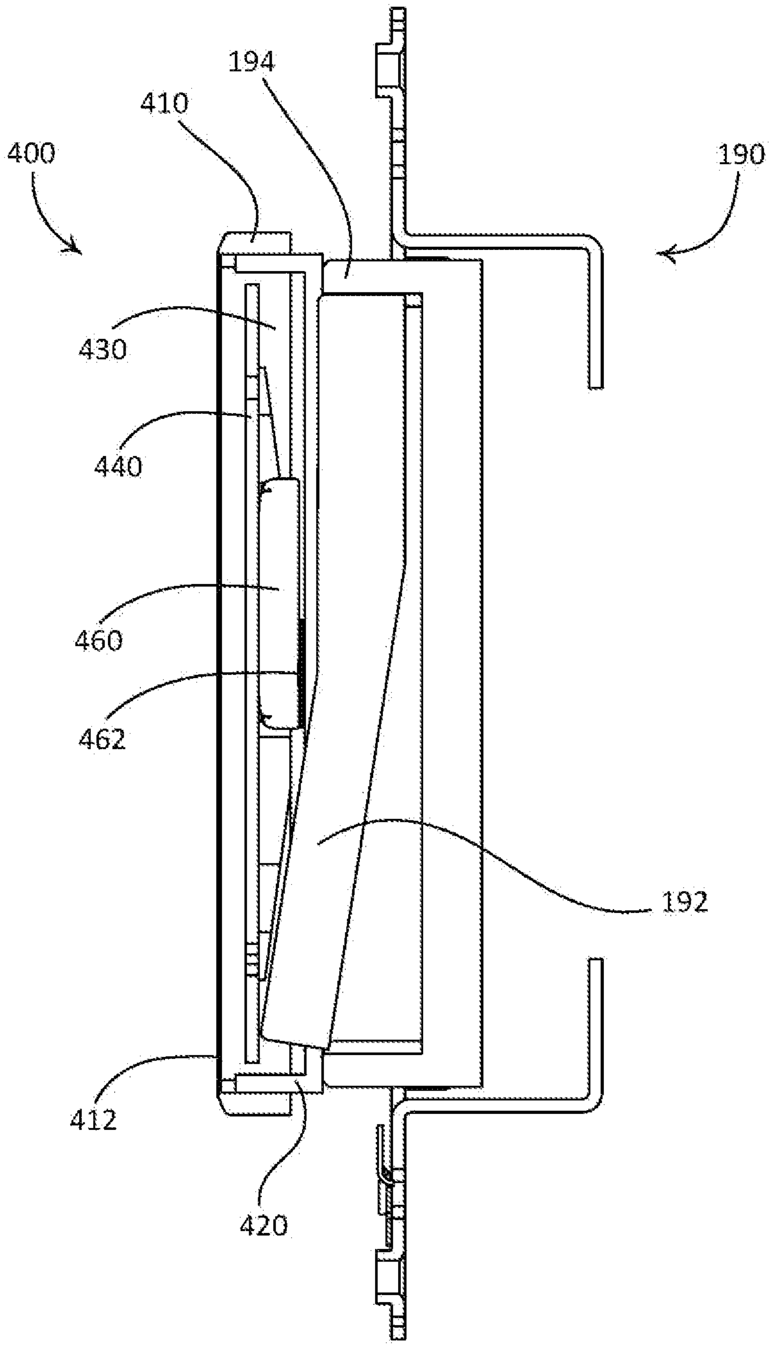
FIG. 24 is a cross-section view of the example control unit shown in FIG. 19 mounted to a light switch and illustrating the battery in the second position in relation to the paddle actuator of the mechanical switch.

The battery holder 462 may be configured to receive a single battery (e.g., battery 460) in one of two positions for powering the electrical circuitry of the control unit 410. The battery 460 may be configured to be installed in the control unit 410 based on the position of the paddle actuator 192 when power is being delivered to the electrical load(s) associated with the mechanical switch 190. The battery 460 may be installed within the battery holder 462 in an orientation that corresponds to the position of the mechanical switch 190. For example, the electrical contact member 466 may define a first edge 461 and a second edge 463. The second edge 463 may be opposed to the first edge 461, for example, on an opposed side of the electrical contact member 466. The battery 460 may be installed from the first edge 461 of the electrical contact member 466 into a first position. For example, the battery holder 462 may receive the battery into the slot 469 from the first edge 461. The first position may correspond to an upper portion of the paddle actuator 192 protruding into the void 430 (e.g., as shown in FIGS. 21 and 23) when power is delivered to the electrical load(s) associated with the mechanical switch 190. When installed in the first position, the battery 460 may extend further beyond the first edge 461 of the electrical contact member 466 than beyond the second edge 463 of the electrical contact member 466. The battery 460 may be installed from the second edge 463 of the electrical contact member 466 into a second position. For example, the battery holder 462 may receive the battery into the slot 469 from the second edge 463. The second position may correspond to a lower portion of the paddle actuator 192 protruding into the void 430 (e.g., as shown in FIGS. 22 and 24) when power is delivered to the electrical load(s) associated with the mechanical switch 190. When installed in the second position, the battery 460 may extend further beyond the second edge 463 of the electrical contact member 466 than beyond the first edge 461 of the electrical contact member 466.

The electrical contact member 466 may be configured to provide an electrical contact for the battery 460 when installed in the first position or the second position. For example, the electrical contact member 466 may be biased toward the PCB 440 such that the electrical contact member 466 applies a force on the battery 460. The electrical contact member 466 may define a protrusion 467 that is configured to extend into the slot 469 toward the PCB 440. The protrusion 467 may be configured to abut the battery 460. The protrusion 467 may be configured to secure the battery 460 within the battery holder 462 (e.g., the slot 469). The protrusion 467 may be configured to provide the electrical contact for the battery 460.

The base 420 may be configured to be secured to the protruding portion of the paddle actuator 192 (e.g., such as the base 120 and/or the base 220). As the base 420 is secured to the protruding portion of the paddle actuator 192, a rear surface of the base 420 may be biased against the bezel 194 of the mechanical switch 190. With the base 420 attached to the paddle actuator 192 (e.g., as shown in FIGS. 23 and 24), the control unit 410 may be attached to the base 420.

FIGS. 25-32 depict another example remote control device 500 that may be installed in a load control system, such as a lighting control system. The load control system may include a mechanical switch, such as the mechanical switch 190, that may be in place prior to installation of the remote control device 500, for example pre-existing in the load control system. The load control system may further include one or more electrical loads, such as lighting loads. The mechanical switch 190 may be coupled in series electrical connection between an alternating current (AC) power source and the one or more electrical loads (not shown), such as a controllable light source. The load control system may further include one or more load control devices (not shown) that are electrically connected to the one or more electrical loads and/or integral to the one or more electrical loads, as described herein.

As shown, the example remote control device 500 may include a control unit 510, a cover portion 530 (e.g., a mounting adapter), and a cover base 520 (e.g., a first base). In addition, the remote control device 500 may include a control base 515 (e.g., a second base) that may operate as a mount for the control unit 510. The control base 515 may alternatively be referred to as a first base, a second base, a control base portion, and/or a control mounting assembly. The control unit 510 and the control base 515 may be configured such that the control unit 510 may be removably attached to the control base 515. The control unit 510 may alternatively be referred to as a control module. It should be appreciated that other control units described herein may similarly be alternatively referred to as control modules.

Figure 25:
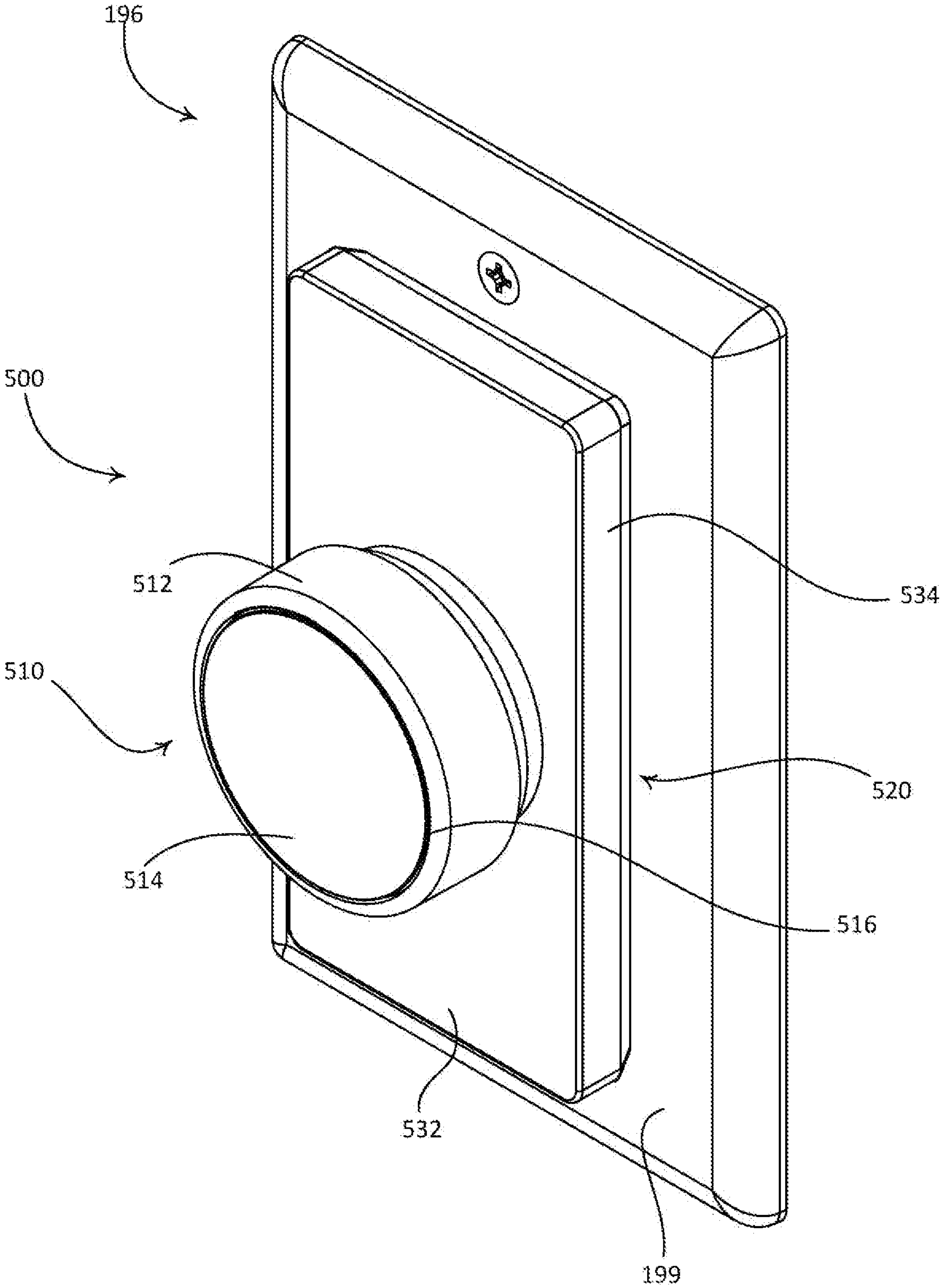
FIG. 25 is a perspective view of an example remote control device having another alternate control unit configuration.
Figure 27:
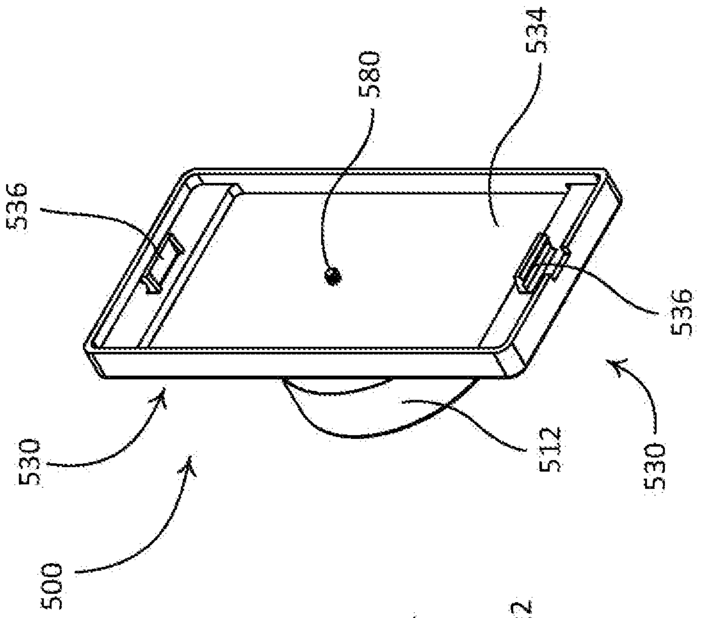
FIG. 27 is a rear perspective view of an example control unit and an example adapter of the example remote control device shown in FIG. 25.
Figure 26:
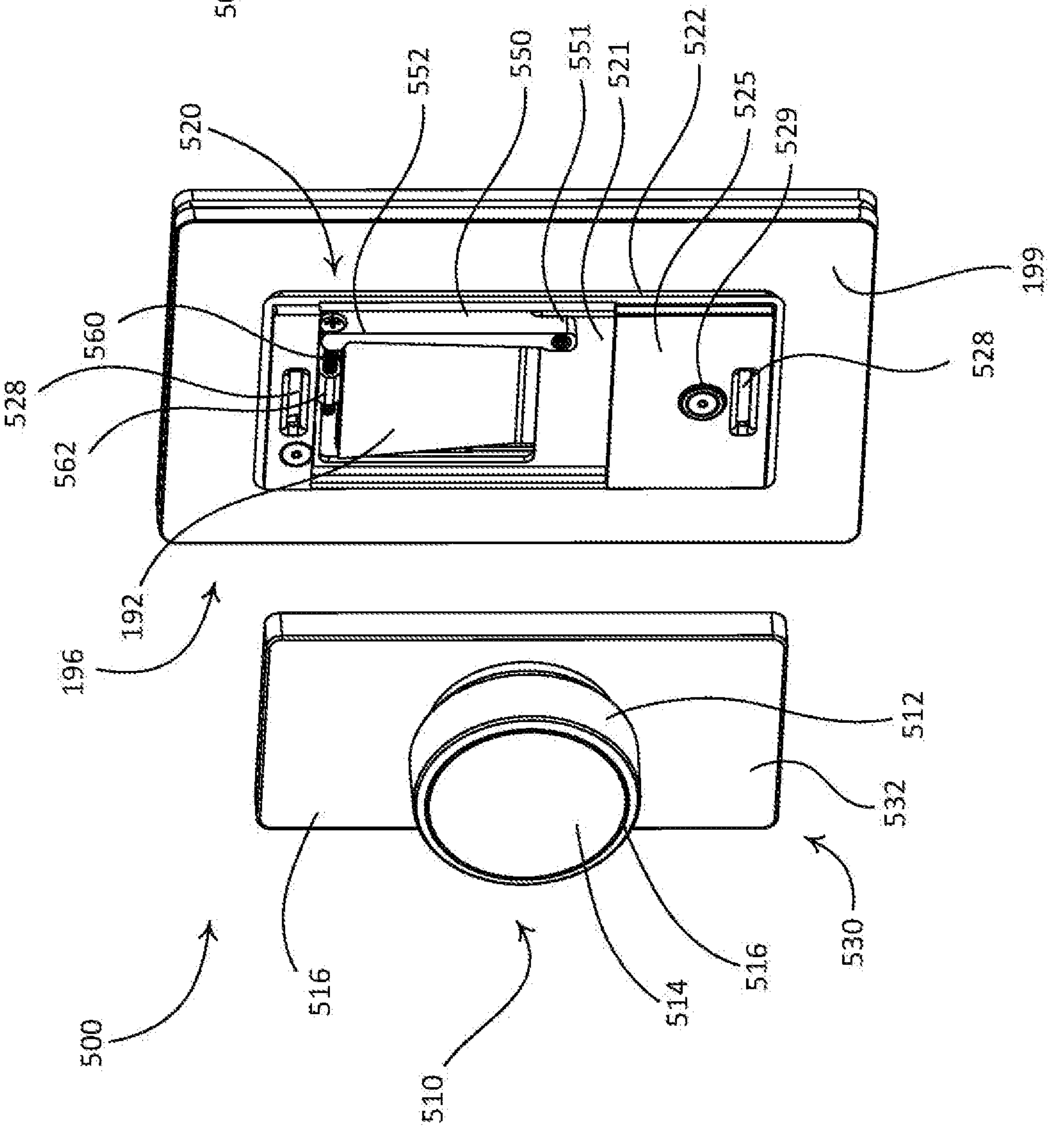
FIG. 26 is a partially exploded view of the example remote control device shown in FIG. 25 with an example base component attached to a paddle actuator of a light switch.
Figure 28:
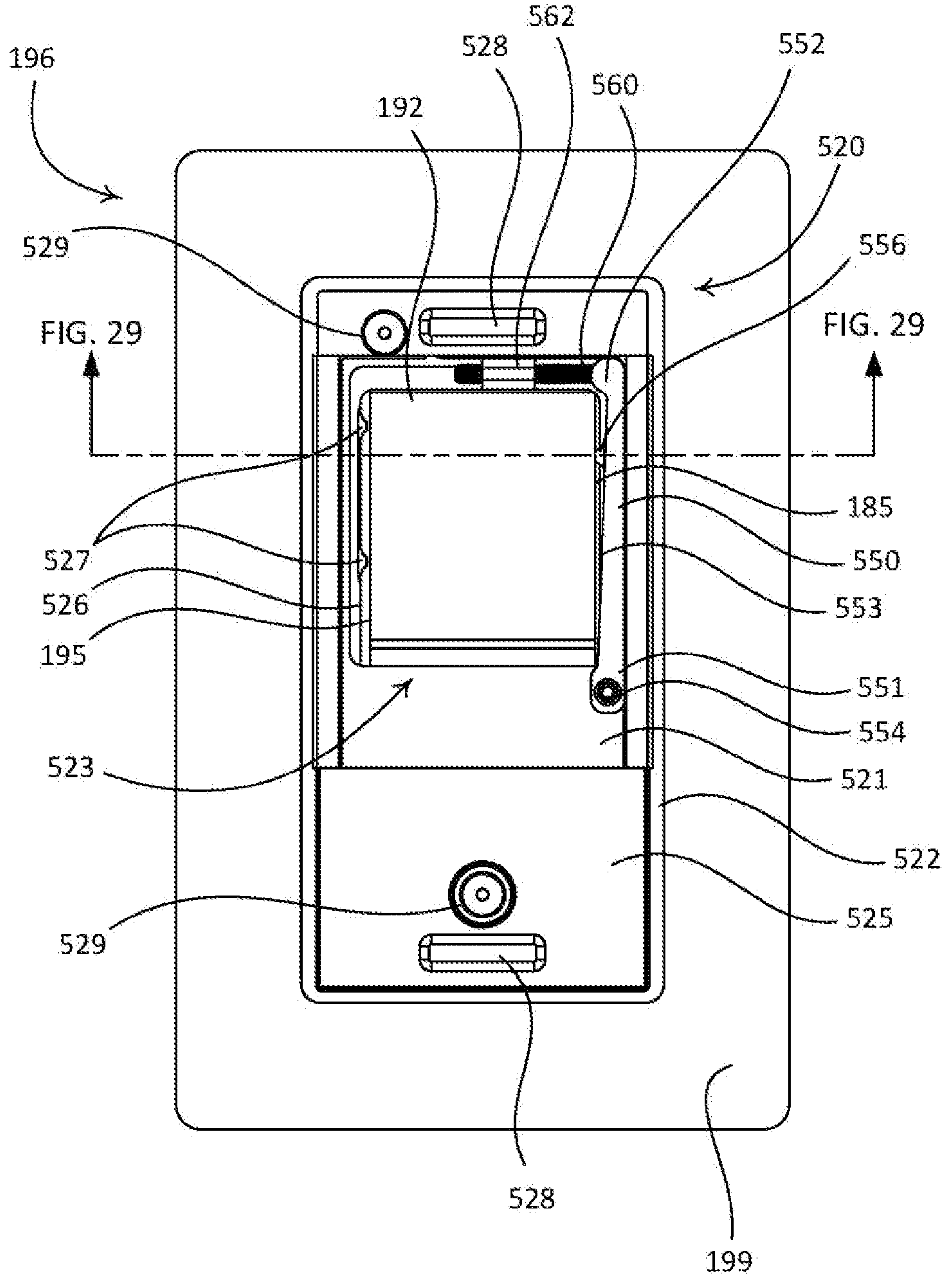
FIG. 28 is a front view of the example base component of the example remote control device illustrated in FIG. 25 attached to the paddle actuator of the light switch.
Figure 29:
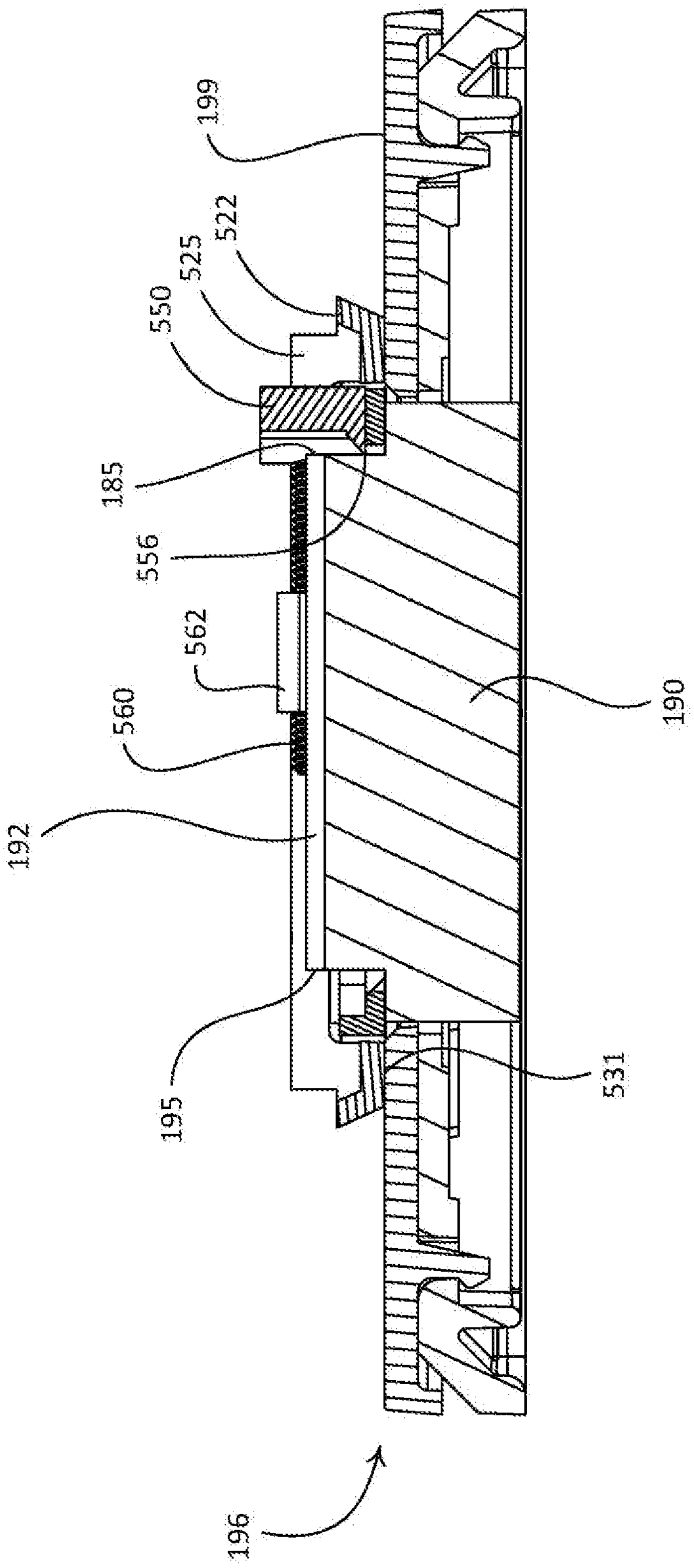
FIG. 29 is a cross-section view of the example base component of the example remote control device illustrated in FIG. 25 attached to the paddle actuator of the light switch.
Figure 30:
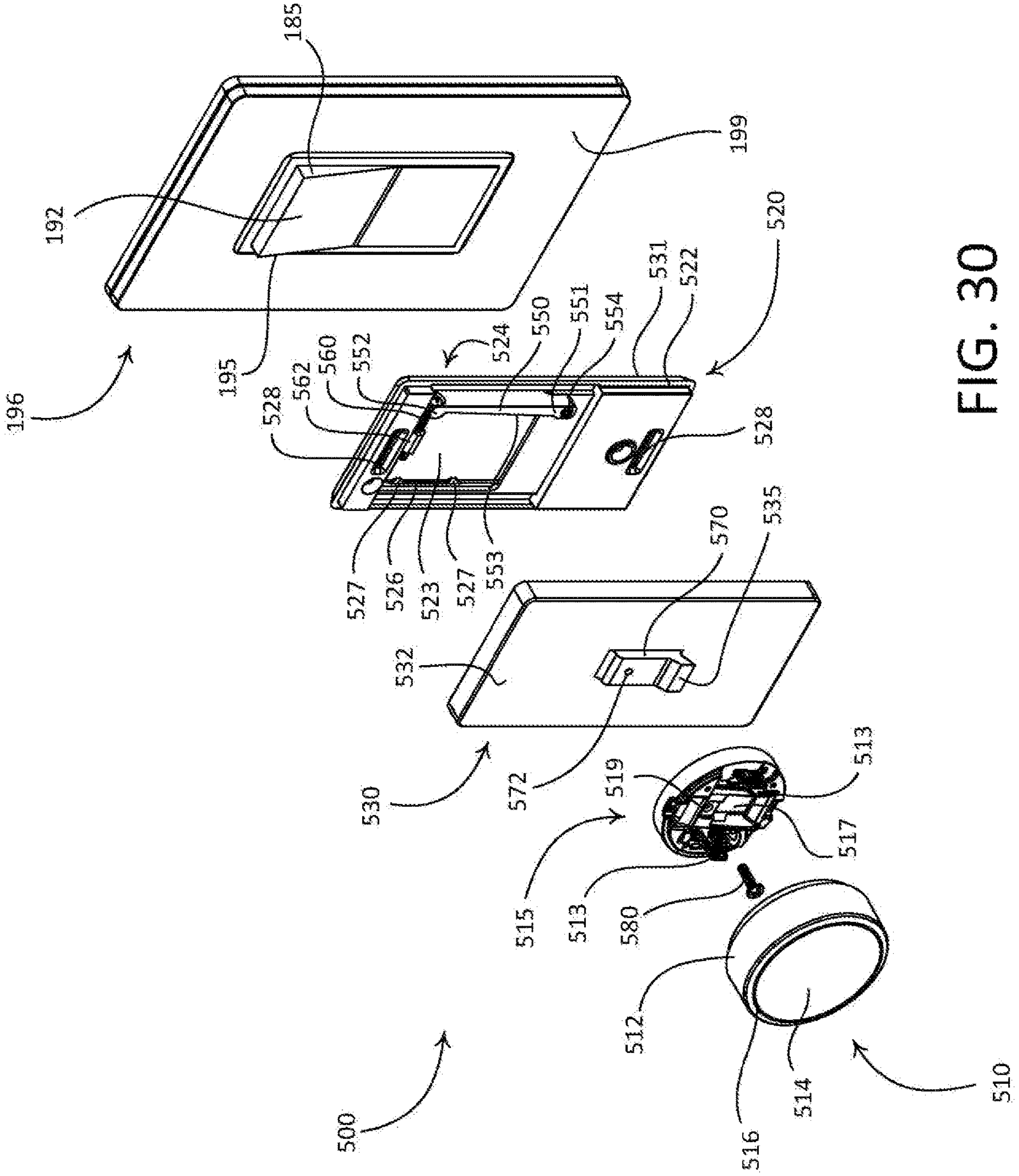
FIG. 30 is an exploded view of the example remote control device shown in FIG. 25.
Figure 31:
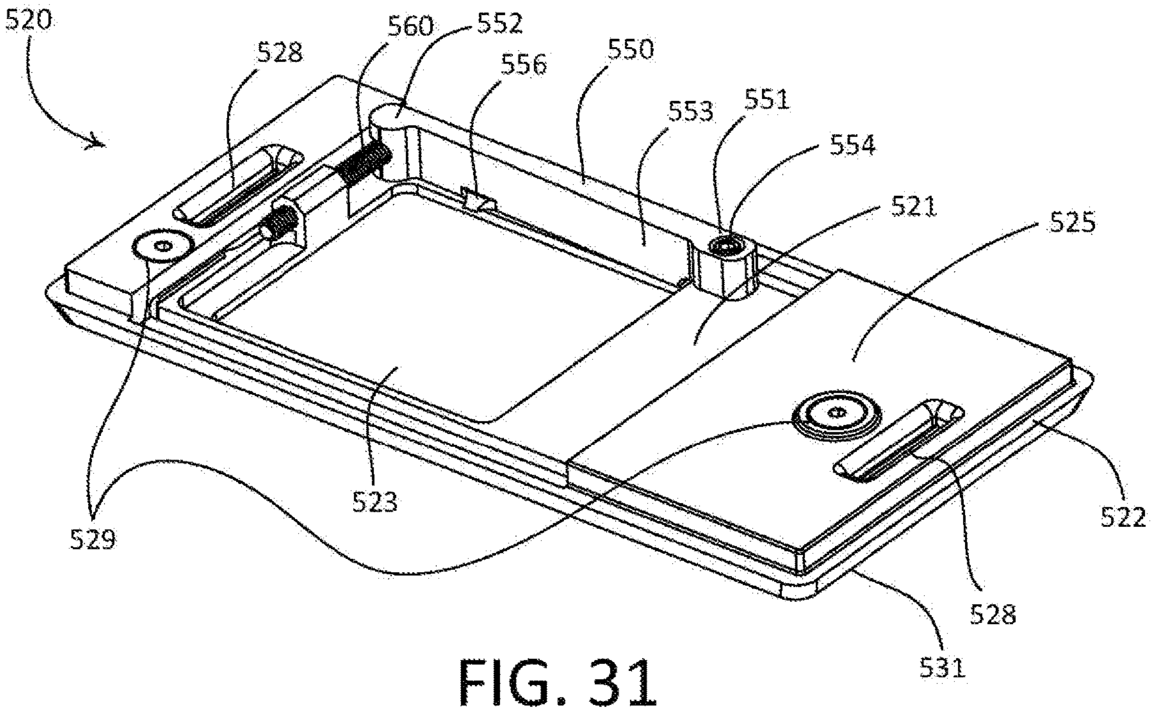
FIG. 31 is a perspective view of the example base component of the example remote control device illustrated in FIG. 25.
Figure 32:
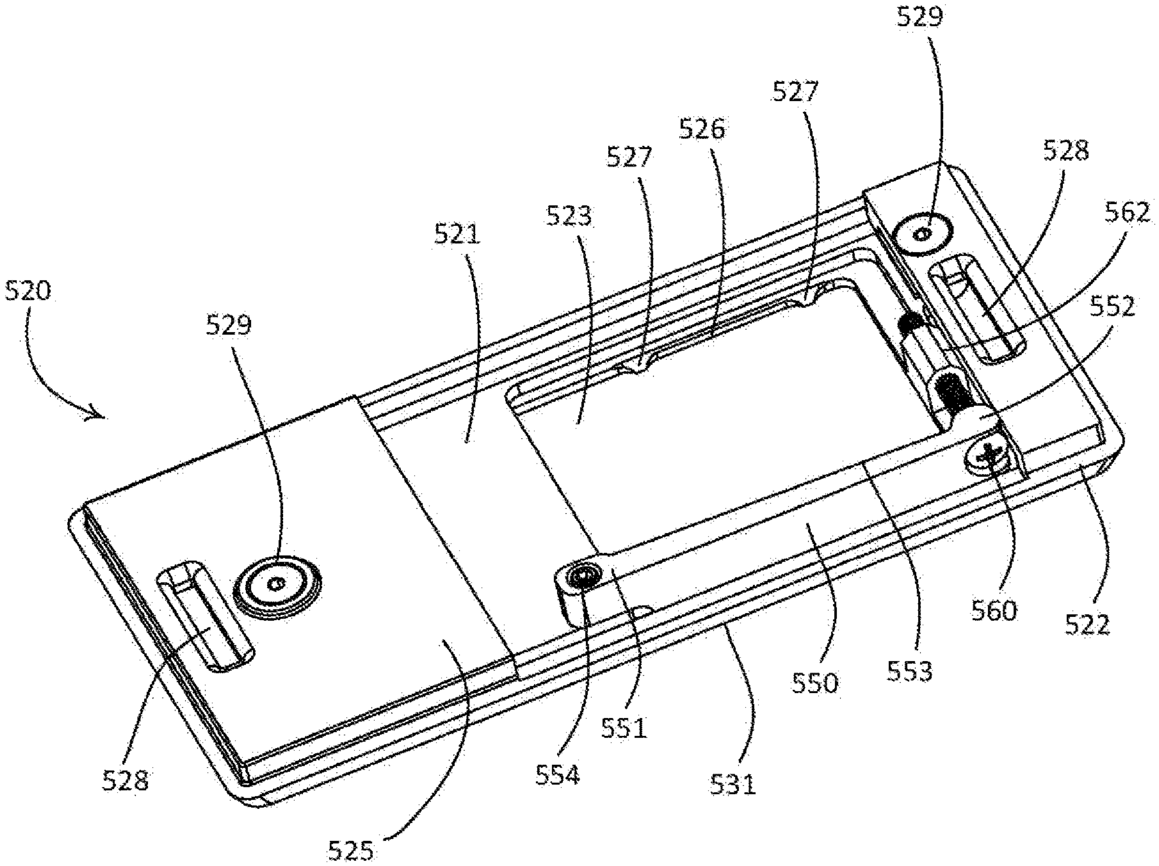
FIG. 32 is a perspective view of the example base component of the example remote control device illustrated in FIG. 25.

The control unit 510 may comprise a user interface including a rotating portion 512 and an actuation portion 514. The rotating portion 512 may be rotatable with respect to the control base 515. For example, as shown, the control unit 510 includes an annular rotating portion 512 that is configured to rotate about the control base 515. The remote control device 500 may be configured such that the control unit 510 and the control base 515 are removably attachable to one another. FIG. 30 depicts the remote control device 500 with the control unit 510 detached from the control base 515. When the control unit 510 is attached to the control base 515 (e.g., as shown in FIG. 25), the rotating portion 512 may be rotatable in opposed directions about the control base 515, for example in the clockwise or counter-clockwise directions. The control base 515 may be configured to be mounted over a light switch such that the application of rotational movement to the rotating portion 512 does not actuate the light switch.

The actuation portion 514 may be operated separately from or in concert with the rotating portion 512. As shown, the actuation portion 514 may include a circular surface within an opening defined by the rotating portion 512. In an example implementation, the actuation portion 514 may be configured to move inward toward the light switch to actuate a mechanical switch (not shown) inside the control unit 510, for instance as described herein. The actuation portion 514 may be configured to return to an idle or rest position (e.g., as shown in FIG. 25) after being actuated. In this regard, the actuation portion 514 may be configured to operate as a toggle control of the control unit 510.

The remote control device 500 may be configured to transmit one or more wireless communication signals (e.g., RF signals) to one or more control devices. The remote control device 500 may include a wireless communication circuit, e.g., an RF transceiver or transmitter (not shown), via which one or more wireless communication signals may be sent and/or received. The control unit 510 may be configured to transmit digital messages (e.g., including commands) in response to one or more actuations applied to the control unit 510, such as operation of the rotating portion 512 and/or the actuation portion 514. The digital messages may be transmitted to one or more devices associated with the remote control device 500, such as the controllable light source. For example, the control unit 510 may be configured to transmit a command via one or more RF signals to raise the intensity of the controllable light source in response to a clockwise rotation of the rotating portion 512 and a command to lower the intensity of the controllable light source in response to a counterclockwise rotation of the rotating portion 512. The control unit 510 may be configured to transmit a command to toggle the controllable light source (e.g., from off to on or vice versa) in response to an actuation of the actuation portion 514. In addition, the control unit 510 may be configured to transmit a command to turn the controllable light source on in response to an actuation of the actuation portion 514 (e.g., if the control unit 510 knows that the controllable light source is presently off). The control unit 510 may be configured to transmit a command to turn the controllable light source off in response to an actuation of the actuation portion 514 (e.g., if the control unit 510 knows that the controllable light source is presently on).

As described herein, the remote control device 500 may comprise a battery (not shown) for powering at least the remote control device 500. The remote control device 500 may be configured to enable releasable attachment of the control unit 510 to the control base 515. For example, the control base 515 may include a release mechanism that may be actuated to release the control unit 510 from the control base 515. For example, the control unit 510 may comprise two tabs (not shown) configured to snap onto respective attachment clips 513 on the control base 515. The control unit 510 may be installed on the control base 515 by pushing the control unit towards the control base 515 until the tabs of the control unit 510 engage the attachment clips 513. The control unit 510 may be released from the control base 515 by pulling the control unit 510 away from the control base 515. In addition, the control base 515 may include a sliding release tab that may be actuated to release the control unit 510 from the control base 515.

The remote control device 500 may be configured to be installed over a paddle actuator 192 (e.g., instead of a toggle actuator). The cover portion 530 may be configured to cover the actuator of the mechanical switch and receive the control base 515. For example, the control base 515 may be attached (e.g., releasably attached) to the cover portion 530. The cover base 530 may define an opening 517 for allowing for attachment of the cover base 530 to the cover portion 530 (e.g., as will be described in greater detail below). The cover portion 530 may be configured to releasably retain the control base 515. The cover portion 530 may define a front surface 532 and a rear surface 534. The cover portion 530 may include a mounting tab 535 that extends from the front surface 532. The mounting tab 535 may be configured to be received in the opening 517 of the control base 515. The mounting tab 535 may be configured to prevent rotation of the control base 515 when the control base 515 is attached to the cover portion 530 and the rotating portion 512 is rotated. The cover portion 530 may include one or more tabs 536 that extend from the rear surface 534. The one or more tabs 536 may be configured to secure the cover portion 530 to the cover base 520. Although the control base 515 is shown in the Figures as being separate from the cover portion 530, it should be appreciated that the control base 515 may be configured as an integral part of the cover portion 530. For example, the cover portion 530 may include the control base 515. Stated differently, the control base 515 may be part of the cover portion 530.

The cover base 520 may be configured to releasably retain the cover portion 530 when the control base 515 is attached to the cover portion 530. The cover base 520 may include a frame 522 and an engagement mechanism 524. The frame 522 may be configured to be mounted over the actuator 192 of the mechanical switch 190. The frame 522 may include a frame opening 523 that extends therethrough. The frame opening 523 may be configured to receive a portion of the actuator 192.

The engagement mechanism 524 may be configured to secure the cover base 520 to the actuator 192. For example, the engagement mechanism 524 may secure the cover base 520 in a mounted position relative to the actuator 192. The engagement mechanism 524 may cause a rear surface 531 to be biased against an outer surface 199 of the faceplate 196 such that the actuator 192 is maintained in a first position in which power is delivered to the electrical load. The engagement mechanism 524 may be operable to contact a first side 185 of the actuator 192 such that an opposed second side 195 of the actuator 192 is biased against a corresponding inner wall 526 of the frame 522. The inner wall 526 may define (e.g., partially define) the frame opening 523. The inner wall 526 may include one or more teeth (e.g., such as teeth 527). The teeth 527 may be configured to abut the opposed second side 195 of the actuator 192.

The engagement mechanism 524 may include a clamp arm 550 (e.g., a bar), for example, as shown in FIGS. 26 and 28-30. The clamp arm 550 may extend into the frame opening 523. A first end 551 of the clamp arm 550 may be supported by the frame 522. A second end 552 of the clamp arm 550 may be translatable toward a center of the frame opening 523 (e.g., toward the inner wall 526). For example, the first end 551 may be pivotally supported by the frame 522 such that the second end 552 is configured to move toward (e.g., and away from) the inner wall 526. For example, the cover base 520 may define a pivot joint 554. The pivot joint 554 may be located proximate to the frame opening 523. The clamp arm 550 may be connected to the frame 522 at the pivot joint 554.

The engagement mechanism 524 may include a screw 560. The screw 560 may operably connect the second end 552 of the clamp arm 550 to the frame 522, for example, via a sleeve 562. The sleeve 562 may be attached to the cover base 520 (e.g., the frame 522) The screw 560 may be configured to translate the clamp arm 550 toward (e.g., and away from) the inner wall 526. For example, driving the screw 560 (e.g., clockwise) may cause the second end 552 of the clamp arm 550 to travel toward the inner wall 526. Driving the screw 560 in the opposite direction (e.g., counter-clockwise) may cause the second end 552 of the clamp arm 550 to travel away from the inner wall 526.

The pivot joint 554 may be configured to enable operation of the clamp arm 550 between a disengaged position and an engaged position with the protruding portion of the paddle actuator 192. For example, the clamp arm 550 may pivot about the pivot joint 554 as the screw 560 is rotated. The disengaged position may be defined as the clamp arm 550 not being in contact with the actuator 192. The engaged position may be defined as the clamp arm 550 being in contact with the actuator 192. Clockwise rotation of the screw 560 may pivot the clamp arm 550 from the disengaged position to the engaged position. Counter-clockwise rotation of the screw 560 may pivot the clamp arm 550 from the engaged position to the disengaged position.

The pivot joint 554 may be a revolute joint (e.g., such as a pin joint or a hinge joint) having a pin that extends through the clamp arm 550 and the frame 522. The pivot joint 554 may be configured to enable the clamp arm 550 to rotate about the pin (e.g., an axis defined by the pin). Alternatively, the pivot joint 554 may be a cylindrical joint, a spherical joint, a saddle joint, or another similar joint.

The clamp arm 550 may define an edge 553 that faces the center of the frame opening 523. The edge 553 (e.g., at least a portion of the edge 553) may be configured to abut the first side 185 of the actuator 192. For example, the edge 553 may abut the first side 185 of the actuator 192 as the second end 552 of the clamp arm 550 is translated toward the center of the frame opening 523. The edge 553 may include a tooth 556 (e.g., one or more teeth). The tooth 556 may extend from the edge 553 toward the center of the frame opening 523. The tooth 556 may engage the first side 185 of the actuator 192 (e.g., when the clamp arm 550 is in the engaged position).

The frame 522 may define one or more slots 528. The slots 528 may be configured to receive corresponding tabs 536 that extends from the rear surface 534 of the cover portion 530, for example, to secure the cover portion 530 to the cover base 520.

The cover base 520 (e.g., the frame 522) may include a plate 521 and a carrier 525. The plate 521 may be metal. The plate 521 may define the frame opening 523. The clamp arm 550 may attach to the plate 521, for example, via the pivot joint 554. The carrier 525 may attach to the plate 521, for example, via fasteners 529. The carrier 525 may be plastic. The carrier 525 may be configured to hide (e.g., cover) at least a portion of the plate 521 from view.

The remote control device 500 may include a fastener 580. The fastener 580 may be configured to secure the remote control device 500 (e.g., the control base 515) to the cover portion 530. For example, the fastener 580 may be configured to secure the control base 515 to a platform 570 that extends from the front surface 532 of the cover portion 530. The mounting tab 535 may extend from the platform 570. As previously mentioned, the mounting tab 535 may be configured to be received in the opening 517 of the control base 515 to prevent rotation of the control base 515 when the control base 515 is attached to the cover portion 530 and the rotating portion 512 is rotated. The platform 570 may define an aperture 572. The aperture 572 may receive the fastener 580, for example, to secure the remote control device 500 (e.g., the control base 515) to the cover portion 530. The aperture 572 may be threaded. The control base 515 may include a through-hole 519 that is configured to receive the fastener 580. A rear surface of the control base 515 may abut the front surface 532 of the cover portion 530 when the remote control device 500 is secured to the cover portion 530.

It should be appreciated that the cover base 520 is not limited to the respective configurations illustrated and described herein. For example, the cover base 520 may be configured to allow releasable attachment of a control unit (e.g., such as control units 110, 210, 310, and 410).

It should be appreciated that the bases 120, 220, 320, 420, and 520 are not limited to the respective configurations illustrated and described herein, and that respective components of the bases may alternatively be configured with other suitable geometries. For example, the respective bases 120, 220, 320, 420, and 520 may be alternatively configured such that their outer walls bound greater or lesser areas. To illustrate, the outer walls of one or more of the bases 120, 220, 320, 420, and 520 may be configured to bound an area that is smaller than the footprint of the paddle actuator 192 of the mechanical switch 190, which may allow the faceplate 196 to be removed without disturbing the frame or necessitating its detachment from the paddle actuator 192. Additionally, it should be appreciated that the respective clamp arms 130, 230, 550 of the bases 120, 220, 520 are not limited to the respective configurations illustrated and described herein, and may alternatively be configured with other suitable geometries, for instance to define alternative engagement surfaces.

It should further be appreciated that one or more of the bases 120, 220, 320, 420, and 520 may be alternatively configured to allow releasable attachment of control units having geometries different from those of the illustrated control units. To illustrate, one or more of the bases 120, 220, 320, 420, and 520 may be alternatively configured to allow releasable attachment of control units having respective footprints (e.g., areas) that are larger than the corresponding footprints of the bases, for instance such that the control units enclose the frames and/or at least partially hide the frames from view. Additionally, one or more of the bases 120, 220, 320, 420, and 520 may be alternatively configured to allow releasable attachment of control units other than the illustrated control units 110, 210, 310, 410, and 510 such as control units having different geometries and/or defining other types of user interfaces, for example.

It should further still be appreciated that configuring the base of a remote control device such that the frame of the base biases against the bezel of a mechanical switch to which the base is mounted (e.g., in accordance with the bases 120, 220, 320, 420, and 520 illustrated and described herein) may provide one or more advantages. For example, so configuring the base may limit or reduce the need to account for variables in one or more of the lateral (e.g., side-to-side), longitudinal (e.g., upward and downward), and transverse (e.g., along a direction perpendicular to the outer surface of the faceplate) that may be exhibited by the respective dimensions or geometries (e.g., paddle heights) of different mechanical switches and/or installation conditions of the mechanical switches. Additionally, so referencing the base to the bezel of the mechanical switch, for instance rather than to the outer surface of the faceplate, may eliminate the need to account for the frame enclosing the bezel of the mechanical switch, since bezel dimensions may vary from switch to switch.

It should further still be appreciated that any of the example remote control devices 100, 200, 300, 400, and 500 illustrated and described herein may provide a simple retrofit solution for an existing switched control system and may ease the installation of a load control system or enhance an existing load control system installation. A load control system that integrates one of the remote control devices 100, 200, 300, 400, or 500 may provide energy savings and/or advanced control features, for example without requiring any electrical re-wiring and/or without requiring the replacement of any existing mechanical switches.

It should further still be appreciated that load control systems into which the example remote control devices 100, 200, 300, 400, and/or 500 may be integrated are not limited to the example load control devices and/or electrical loads described above. For example, load control systems into which the remote control devices 100, 200, 300, 400, and/or 500 may be integrated may include one or more of: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; hydraulic valves for use in one or more radiators of a radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

The invention claimed is:

1. A base configured to be attached to a paddle actuator of an installed mechanical switch that controls whether power is delivered to an electrical load, the base comprising:

a frame comprising an end wall, opposed side walls, and an edge that is distal from the end wall, wherein the frame defines an opening that is configured to receive a protruding portion of the paddle actuator therein, the protruding portion of the paddle actuator projecting outward when the mechanical switch is operated into a position that causes power to be delivered to the electrical load, the protruding portion of the paddle actuator comprising a front surface that is configured to be pressed to operate the mechanical switch, a first side surface, and a second side surface, wherein, when the protruding portion is received in the opening, the frame at least partially surrounds the paddle actuator;

a clamp arm that is configured to secure the base to the protruding portion of the paddle actuator, wherein the clamp arm is attached to the frame at a pivot joint located proximate to the edge of the frame; and a screw that is operatively engaged with the clamp arm such that, when the screw is rotated, the clamp arm is configured to pivot about the pivot joint such that the clamp arm is moved toward the protruding portion of the paddle actuator until the clamp arm abuts the first side surface of the protruding portion of the paddle actuator, wherein the clamp arm is configured to apply a first force on the first side surface of the protruding portion of the paddle actuator as the screw is further rotated when the clamp arm abuts the protruding portion of the paddle actuator, and wherein the first force applied by the clamp arm is configured such that the frame engages the second side surface of the protruding portion of the paddle actuator to secure the base to the protruding portion of the paddle actuator.

2. The base of claim 1, wherein the screw is received in a sleeve defined by the frame, and wherein the screw is configured to pivot the clamp arm toward the protruding portion of the paddle actuator as the screw is driven into the sleeve.

3. The base of claim 2, wherein the sleeve is located along the edge of the frame.

4. The base of claim 2, wherein the clamp arm defines a plate that is configured to engage a distal end of the screw.

5. The base of claim 4, wherein the screw is configured to push the plate while rotating such that the clamp arm moves toward the protruding portion of the paddle actuator as the screw engages the plate.

6. The base of claim 4, wherein the screw applies a second force on the plate as the screw is driven into the sleeve.

7. The base of claim 1, wherein the frame comprises a tooth extending into the opening, and wherein the tooth is configured to engage the second side surface of the protruding portion of the paddle actuator to secure the base to the protruding portion of the paddle actuator.

8. The base of claim 7, wherein the clamp arm is configured to move into the opening from a location proximate to the frame as the screw is rotated.

9. The base of claim 8, wherein the tooth is a first tooth, and wherein the clamp arm defines a second tooth configured to engage the first side surface of the protruding portion of the paddle actuator to secure the base to the protruding portion of the paddle actuator.

10. The base of claim 1, wherein the frame is configured for releasable attachment of a control unit to the frame.

11. The base of claim 1, wherein the first side surface and the second side surface are perpendicular to the front surface.

12. The base of claim 1, wherein the edge extends between the opposed side walls of the frame.

13. A remote control device for use in a load control system, the remote control device configured to be mounted over an installed mechanical switch that controls whether power is delivered to an electrical load, the remote control device comprising:

a base comprising an end wall, opposed side walls, and an edge that is distal from the end wall, wherein the base defines an opening that is configured to receive a protruding portion of a paddle actuator of the mechanical switch therein, the protruding portion of the paddle actuator projecting outward when the mechanical switch is operated into a position that causes power to be delivered to the electrical load, the protruding portion of the paddle actuator comprising a front surface that is configured to be pressed to operate the mechanical switch, a first side surface, and a second side surface, wherein when the protruding portion is received in the opening, the base at least partially surrounds the paddle actuator;

a control unit that is configured to be attached to the base, the control unit including a user interface, the control unit configured to translate a user input from the user interface into a control signal that controls a load control device;

a clamp arm that is configured to secure the base to the protruding portion of the paddle actuator, wherein the clamp arm is attached to the base at a pivot joint located proximate to the edge of the base; and a screw that is operatively engaged with the clamp arm such that, when the screw is rotated, the clamp arm is configured to pivot about the pivot joint such that the clamp arm is moved toward the protruding portion of the paddle actuator until the clamp arm abuts the first side surface of the protruding portion of the paddle actuator, wherein the clamp arm is configured to apply a first force on the first side surface of the protruding portion of the paddle actuator as the screw is further rotated when the clamp arm abuts the protruding portion of the paddle actuator, and wherein the first force applied by the clamp arm is configured such that the base engages the second side surface of the protruding portion of the paddle actuator to secure the base to the protruding portion of the paddle actuator.

14. The remote control device of claim 13, wherein the screw is received in a sleeve defined by the base, and wherein the screw is configured to pivot the clamp arm toward the protruding portion of the paddle actuator as the screw is driven into the sleeve.

15. The remote control device of claim 14, wherein the sleeve is located along the edge of the base.

16. The remote control device of claim 15, wherein the clamp arm defines a plate that is configured to engage a distal end of the screw.

17. The remote control device of claim 16, wherein the screw is configured to push the plate while rotating such that the clamp arm moves toward the protruding portion of the paddle actuator as the screw engages the plate.

18. The remote control device of claim 16, wherein the screw applies a second force on the plate as the screw is driven into the sleeve.

19. The remote control device of claim 13, wherein the base defines a tooth extending into the opening, and wherein the tooth is configured to engage the second side surface of the protruding portion of the paddle actuator to secure the base to the protruding portion of the paddle actuator.

20. The remote control device of claim 19, wherein the clamp arm is configured to move into the opening from a location proximate to the base as the screw is rotated.

21. The remote control device of claim 20, wherein the tooth is a first tooth, and wherein the clamp arm defines a second tooth configured to engage the first side surface of the protruding portion of the paddle actuator to secure the base to the protruding portion of the paddle actuator.

22. The remote control device of claim 13, wherein the base is configured for releasable attachment of the control unit to the base.

23. The remote control device of claim 13, wherein the first side surface and the second side surface are perpendicular to the front surface.

24. The remote control device of claim 13, wherein the edge extends between the opposed side walls of the base.

25. The remote control device of claim 13, wherein the user interface comprises an actuation portion that may be actuated to generate the user input.

26. The remote control device of claim 25, wherein the user interface is configured as a touch sensitive surface.

27. The remote control device of claim 25, wherein the user interface comprises a rotating portion rotatable with respect to the base.

* * * * *